United States Patent
Junk

(10) Patent No.: US 9,611,873 B2
(45) Date of Patent: Apr. 4, 2017

(54) PRESSURE CONTROL FOR PARTIAL STROKE TESTS

(71) Applicant: FISHER CONTROLS INTERNATIONAL LLC, Marshalltown, IA (US)

(72) Inventor: Kenneth W. Junk, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 15/066,495

(22) Filed: Mar. 10, 2016

(65) Prior Publication Data

US 2016/0274598 A1 Sep. 22, 2016

Related U.S. Application Data

(60) Provisional application No. 62/135,377, filed on Mar. 19, 2015.

(51) Int. Cl.
| | | |
|---|---|---|
| F15B 19/00 | (2006.01) | |
| G05D 7/00 | (2006.01) | |
| F16K 37/00 | (2006.01) | |
| G05B 15/00 | (2006.01) | |

(52) U.S. Cl.
CPC ........ *F15B 19/005* (2013.01); *F16K 37/0083* (2013.01); *G05D 7/00* (2013.01); *G05B 15/00* (2013.01)

(58) Field of Classification Search
None
See application file for complete search history.

(56) References Cited

U.S. PATENT DOCUMENTS

| | | | |
|---|---|---|---|
| 6,272,401 B1 * | 8/2001 | Boger | F15B 5/006 700/282 |
| 2002/0145515 A1 | 10/2002 | Snowbarger et al. | |
| 2011/0054828 A1 | 3/2011 | Junk | |
| 2011/0114191 A1 * | 5/2011 | Wheater | F16K 37/0091 137/12 |
| 2013/0304238 A1 | 11/2013 | Seyller et al. | |
| 2014/0100673 A1 * | 4/2014 | Amirthasamy | F16K 37/0075 700/32 |

FOREIGN PATENT DOCUMENTS

| | | |
|---|---|---|
| DE | 102005004477 A1 | 8/2006 |
| DE | 102007034060 A1 | 1/2009 |

OTHER PUBLICATIONS

International Search Report and Written Opinion for PCT Application No. PCT/US2016/023079 dated Jun. 23, 2016.

* cited by examiner

*Primary Examiner* — Qing Wu
(74) *Attorney, Agent, or Firm* — Marshall, Gerstein & Borun LLP

(57) ABSTRACT

A method of testing a valve actuator coupled to a process control device includes the steps of: controlling, with the process control device, a pressure within the valve actuator to ramp from an initial pressure towards a pre-determined pressure limit; monitoring a position of the valve actuator to detect a travel of the valve actuator; and upon one of the pressure within the valve actuator reaching the pre-determined pressure limit or detecting the travel of the valve actuator, controlling the pressure within the valve actuator to return to the initial pressure.

18 Claims, 16 Drawing Sheets

PRESSURE CONTROL FOR PARTIAL STROKE TESTS

CROSS-REFERENCE TO RELATED APPLICATIONS

This application claims priority to U.S. Provisional Patent Application No. 62/135,377, entitled "Pressure Control for Partial Stroke Tests" and filed Mar. 19, 2015, the entire disclosure of which is hereby incorporated by reference herein.

FIELD OF THE DISCLOSURE

The present disclosure is directed to a method and apparatus for calibrating and testing positioners and, more particularly, to a method and apparatus for determining a bias of positioners and performing tests, such as partial stroke tests, with pressure control techniques.

BACKGROUND

In certain industries, such as the petroleum industry, partial stroke testing of emergency shutdown valves (ESVs) is increasingly required by regulatory bodies. However, ESVs and/or other valve assemblies that are part of "Safety Instrumented Systems" (SISs) are generally designed for on/off operation and connections between valve stems and actuators are not tight, resulting in significant lost motion. Further, ESVs are typically characterized by high seal friction and prominent stick-slip dynamics. All of these factors contribute to poor throttling control and complicate partial stoke testing.

In addition, ESVs and/or other components of SISs are typically high gain devices. For example, SIS actuators are often single action pistons with a spring return. A very small change in pressure within a chamber of an actuator can cause a large movement of the piston. As a result, when coupling SIS actuators, or other SIS components, to process control devices (e.g., to perform partial stroke tests or other tests), biases of the process control devices, such as I/P (current to pressure) biases, can have a dramatic impact on the calibration of the SIS components. If a calibration of the SIS components is off by a significant amount, results from tests on the SIS components, such as partial stroke tests, will be meaningless.

SUMMARY

In one embodiment, a method of testing a valve actuator coupled to a process control device comprises the steps of: controlling, with the process control device, a pressure within the valve actuator to ramp from an initial pressure towards a pre-determined pressure limit; monitoring a position of the valve actuator to detect a travel of the valve actuator; and upon one of the pressure within the valve actuator reaching the pre-determined pressure limit or detecting the travel of the valve actuator, controlling the pressure within the valve actuator to return to the initial pressure.

In further accordance with any one or more of the foregoing exemplary aspects of the present invention, the method may further include, in any combination, any one or more of the following preferred forms.

In one preferred form, the method further comprises the step of determining a bias of the process control device controlling the valve actuator by comparing a measured pressure within the valve actuator to a set point pressure utilized by the process control device, wherein controlling the pressure within the valve actuator to ramp from the initial pressure towards a pre-determined pressure limit includes accounting for the bias of the process control device.

In another preferred form, controlling the pressure within the valve actuator to return to the initial pressure includes: controlling the pressure to step from one of the pre-determined pressure limit or the pressure at which the travel of the valve actuator is detected to a stepped pressure higher or lower than the pre-determined pressure limit or the pressure at which the travel of the valve actuator is detected; and after controlling the pressure to step, controlling the pressure to ramp from the stepped pressure towards the initial pressure.

In another preferred form, monitoring the position of the valve actuator to detect the travel of the valve actuator includes monitoring the position of the valve actuator to detect a predetermined amount of travel corresponding to a percentage of a possible travel of the valve actuator.

In another preferred form, controlling the pressure to ramp from the initial pressure towards the pre-determined pressure limit includes controlling the pressure based on a pressure control loop implemented by the process control device, monitoring the position of the valve actuator to detect the certain amount of travel of the valve actuator includes monitoring the position of the valve actuator based on a travel control loop implemented by the process control device, and the travel control loop includes the pressure control loop.

In another preferred form, monitoring the position of the valve actuator to detect the travel of the valve actuator includes monitoring the position of the valve actuator to detect any non-zero travel of the valve actuator.

In another preferred form, controlling the pressure to ramp from the initial pressure towards the pre-determined pressure limit and monitoring the position of the valve actuator includes controlling the pressure and monitoring the position of the valve actuator based on a pressure control loop separate from any other control loops.

In another preferred form, the valve actuator is part of a safety shutdown system.

In another preferred form, the valve actuator is coupled to a spool valve or a relay valve.

In another embodiment, a system comprises an actuator and a process control device coupled to the actuator. The process control device is configured to control a pressure within the actuator to ramp from an initial pressure towards a pre-determined pressure limit, gather measured values indicative of a position of the actuator to detect a travel of the actuator, and upon one of the pressure within the actuator reaching the pre-determined pressure limit or detecting the travel of the actuator, control the pressure within the actuator to return to the initial pressure.

In further accordance with any one or more of the foregoing exemplary aspects of the present invention, the system may further include, in any combination, any one or more of the following preferred forms.

In one preferred form, the process control device is further configured to determine a bias of the process control device controlling the valve actuator by comparing a measured pressure within the valve actuator to a set point pressure utilized by the process control device, wherein controlling the pressure within the valve actuator to ramp from the initial pressure towards a pre-determined pressure limit includes accounting for the bias of the process control device.

In another preferred form, determining the bias of the process control device includes: determining a calibration pressure value corresponding to a particular state of the valve actuator; controlling, with the process control device, the pressure within the valve actuator according to the set point pressure, wherein the set point pressure is based on the calibration pressure value such that the valve actuator maintains the particular state; measuring an actual pressure within the valve actuator; and comparing the actual pressure to the set point pressure to determine the bias of the process control device.

In another preferred form, controlling the pressure within the valve actuator to return to the initial pressure includes: controlling the pressure to step from one of the pre-determined pressure limit or the pressure at which the travel of the valve actuator is detected to a stepped pressure higher or lower than the pre-determined pressure limit or the pressure at which the travel of the valve actuator is detected; and after controlling the pressure to step, controlling the pressure to ramp from the stepped pressure towards the initial pressure.

In another preferred form, the process control device is further configured to determine the pre-determined pressure limit by driving the valve actuator to a hard stop and measuring a pressure corresponding to the hard stop.

In another preferred form, controlling the pressure within the valve actuator to ramp from the initial pressure towards the pre-determined pressure limit includes controlling the pressure to: ramp the pressure from the initial pressure towards a pressure threshold according to a first ramp rate and, upon reaching the pressure threshold, ramp the pressure from the pressure threshold to the pre-determined pressure limit according to a second ramp rate different from the first ramp rate.

In another preferred form, controlling the pressure within the valve actuator to ramp from the initial pressure towards the pre-determined pressure limit includes controlling the pressure to ramp from the initial pressure towards the pre-determined pressure limit according to three or more ramp rates.

In another preferred form, controlling the pressure within the valve actuator to ramp from the initial pressure towards the pre-determined pressure limit includes controlling the pressure to: ramp the pressure from the initial pressure towards a pressure threshold according to a first ramp rate and, upon reaching the pressure threshold, ramp the pressure from the pressure threshold to the pre-determined pressure limit according to a second ramp rate different from the first ramp rate; wherein controlling the pressure within the valve actuator to return to the initial pressure includes: controlling the pressure to step from one of the pre-determined pressure limit or the pressure at which the travel of the valve actuator is detected to a stepped pressure higher or lower than the pre-determined pressure limit or the pressure at which the travel of the valve actuator is detected and, after controlling the pressure to step, controlling the pressure to ramp from the stepped pressure towards the initial pressure.

In yet another embodiment, a computer device comprises one or more processors and one or more non-transitory memories. The non-transitory memories have computer executable instructions stored thereon that, when executed by the one or more processors, cause the computer device to: control a pressure within an actuator to ramp from an initial pressure towards a pre-determined pressure limit; gather measured values indicative of a position of the actuator to detect a travel of the actuator; and upon one of the pressure within the actuator reaching the pre-determined pressure limit or detecting the travel of the actuator, control the pressure within the actuator to return to the initial pressure.

In further accordance with any one or more of the foregoing exemplary aspects of the present invention, the computer device may further include, in any combination, any one or more of the following preferred forms.

In one preferred form, controlling the pressure within the actuator to ramp from the initial pressure towards the pre-determined pressure limit includes controlling the pressure to ramp from the initial pressure towards the pre-determined pressure limit according to two or more ramp rates.

In another preferred form, controlling the pressure within the actuator to return to the initial pressure includes: controlling the pressure to step from one of the pre-determined pressure limit or the pressure at which the travel of the valve actuator is detected to a stepped pressure higher or lower than the pre-determined pressure limit or the pressure at which the travel of the valve actuator is detected; and after controlling the pressure to step, controlling the pressure to ramp from the stepped pressure towards the initial pressure.

DETAILED DESCRIPTION

The present disclosure is directed to calibrating positioners or servo controllers, such as valve positioners, using pressure control techniques and utilizing the positioners or servo controllers to perform tests with pressure control techniques. Specifically, the present disclosure is directed to a method and apparatus to: (i) determine a bias of a positioner by controlling a pressure within, or supplied to, an actuator at constant volume, during end-point pressure control, at a middle pressure value in a range of controlled pressures, or at another convenient time or state of the actuator, and (ii) perform tests (e.g., partial stroke tests) by controlling a pressure within or supplied to an actuator, rather than controlling a travel or position of the actuator. For ease of discussion, specific types of positioners, such as valve positioners coupled to emergency shutdown valves, will be referred to throughout this description. Generally, however, the method and apparatus of the present disclosure may be used to calibrate any suitable components of control valve assemblies and utilize those components to perform tests with pressure control techniques.

By utilizing pressure control (i.e., as opposed to travel control) to calibrate positioners and perform tests, the techniques of the present disclosure may alleviate certain difficulties resulting from the loose connections, significant lost motion, high seal friction, and significant stick-slip dynamics that characterize many ESVs. Specifically, a valve positioner controlling an ESV may generate an estimate of current to pressure (I/P) bias for the valve positioner, which estimate of I/P bias is free of inconsistencies associated with lost motion and valve friction. The positioner may also perform partial stroke testing of an ESV while maintaining control of a pressure within an actuator of the ESV, even in the event that the ESV is stuck.

The techniques of the present disclosure may also generally facilitate the calibration and testing of any suitable positioners other than positioners coupled to ESVs, such as positioners coupled to and controlling compressor anti-surge valves, vent valves, etc. For example, a controller may cause a positioner coupled to a compressor anti-surge valve to perform calibrations and tests using pressure control techniques as described herein, where the compressor anti-surge valve is configured to prevent surges that occur when a compressor outlet pressure is too high in relation to the flow through the compressor. An example controller may also cause a positioner coupled to a throttling valve/actuator assembly to perform calibrations and tests a using pressure control techniques. By utilizing pressure control in these scenarios, a controller may, for example, calibrate positioners while the positioners are in service, without disrupting a corresponding process.

Process Control System Overview

Figure 1:
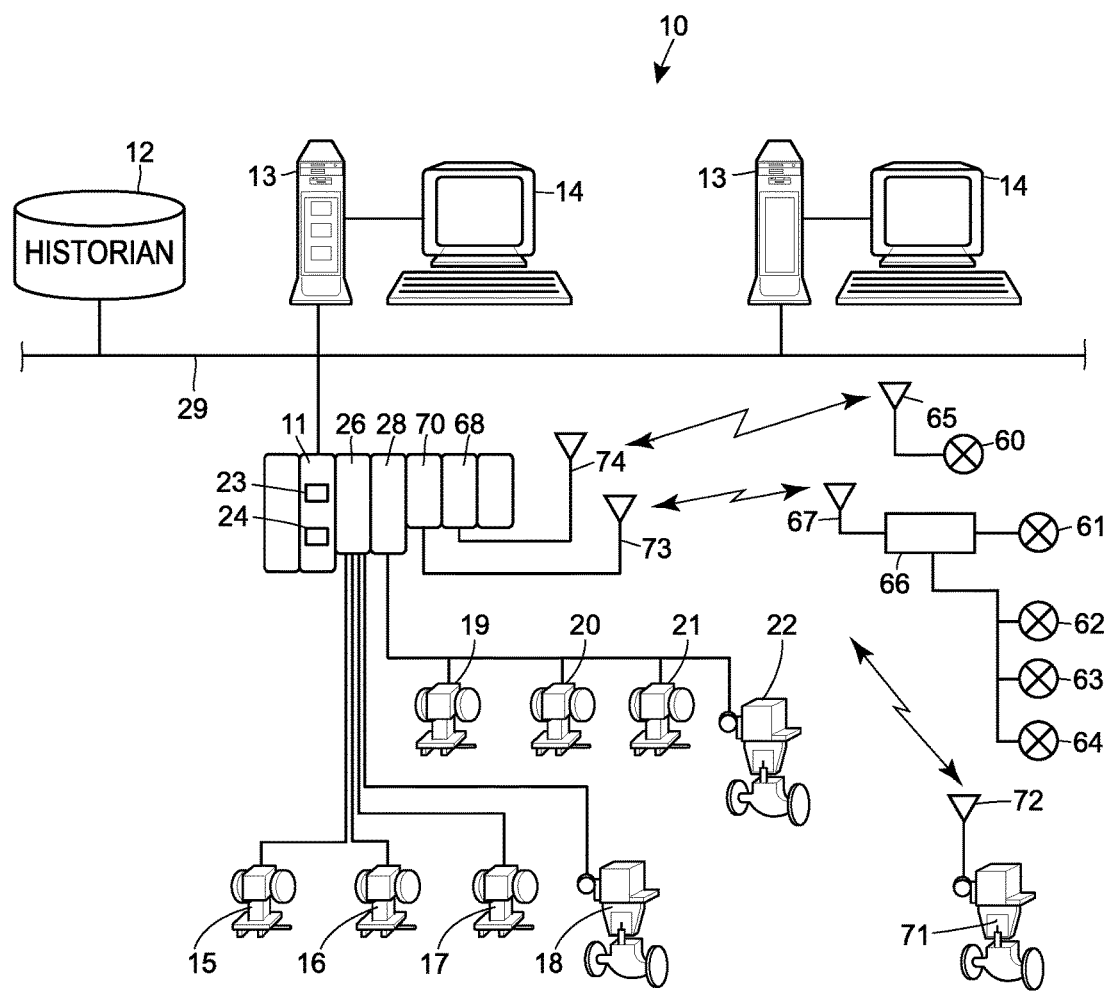
FIG. 1 illustrates an example process control system including positioners and/or actuator/valve assemblies that may be calibrated and/or tested with pressure control techniques.

Referring now to FIG. 1, a process control system 10 constructed in accordance with one version of the present disclosure is depicted incorporating one or more field devices 15, 16, 17, 18, 19, 20, 21, 22, and 71 in communication with a process control device, such as process controller 11. The process controller 11 may cause one or more of the field devices 15, 16, 17, 18, 19, 20, 21, 22, and 71 to perform calibrations and/or tests using pressure control techniques, as discussed further below. The process controller 11 is also in communication with a data historian 12 and one or more workstations 13, each having a display screen 14. So configured, the process controller 11 delivers signals to and receives signals from the field devices 15, 16, 17, 18, 19, 20, 21, 22, and 71 and the workstations 13 to control the process control system 10.

In additional detail, the process controller 11 of the process control system 10 of the version depicted in FIG. 1 is connected via hardwired communication connections to field devices 15, 16, 17, 18, 19, 20, 21, and 22 via input/output (I/O) cards 26 and 28. The data historian 12 may be any desired type of data collection unit having any desired type of memory and any desired or known software, hardware or firmware for storing data. Moreover, while the data historian 12 is illustrated as a separate device in FIG. 1, it may instead or in addition be part of one of the workstations 13 or another computer device, such as a server. The process controller 11, which may be, by way of example, a DeltaV™ controller sold by Emerson Process Management, is communicatively connected to the workstations 13 and to the data historian 12 via a communication network 29 which may be, for example, an Ethernet connection.

As mentioned, the process controller 11 is illustrated as being communicatively connected to the field devices 15, 16, 17, 18, 19, 20, 21, and 22 using a hardwired communication scheme which may include the use of any desired hardware, software, and/or firmware to implement hardwired communications. The hardwired communications may include, for example, standard 4-20 mA communications, and/or any communications using any smart communication protocol such as the FOUNDATION® Fieldbus communication protocol, the HART® communication protocol, etc. The field devices 15, 16, 17, 18, 19, 20, 21, and 22 may be any types of devices, such as positioners, servo controllers, sensors, pressure regulators, control valve assemblies, etc., while the I/O cards 26 and 28 may be any types of I/O devices conforming to any desired communication or controller protocol. In the embodiment illustrated in FIG. 1, the field devices 15, 16, 17, and 18 are standard 4-20 mA devices that communicate over analog lines to the I/O card 26, while the digital field devices 19, 20, 21, and 22 can be smart devices, such as HART® communicating devices and Fieldbus field devices, that communicate over a digital bus to the I/O card 28 using Fieldbus protocol communications. Of course, the field devices 15, 16, 17, 18, 19, 20, 21, and 22 may conform to any other desired standard(s) or protocols, including any standards or protocols developed in the future.

In addition, the process control system 10 depicted in FIG. 1 includes a number of wireless field devices 60 and 71 and a number of other field devices 61, 62, 63, and 64 communicatively connected to a wireless router or other module 66. The field devices 60, 61, 62, 63, and 64 are depicted as transmitters (e.g., process variable sensors) while the field device 71 is depicted as a control valve assembly including, for example, a control valve and an actuator. Wireless communications may be established between the process controller 11 and the field devices 60, 61, 62, 63, 64, and 71 using any desired wireless communication equipment, including hardware, software, firmware, or any combination thereof now known or later developed. In the version illustrated in FIG. 1, an antenna 65 is coupled to and is dedicated to perform wireless communications for the field device 60 (e.g., a transmitter), while the wireless router or other module 66 having an antenna 67 is coupled to collectively handle wireless communications for the field devices 61, 62, 63, and 64 (e.g., transmitters). Likewise, an antenna 72 is coupled to the field device 71 (e.g., a control valve assembly) to perform wireless communications for the field device 71. The field devices 60, 61, 62, 63, and 64 or associated hardware such as module 66 and field device 71 may implement protocol stack operations used by an appropriate wireless communication protocol to receive, decode, route, encode, and send wireless signals via the antennas 65, 67, and 72 to implement wireless communications between the process controller 11 and the field devices 60, 61, 62, 63, 64, and 71.

The process controller 11 is coupled to one or more I/O devices 68 and 70, each connected to a respective antenna 74 and 73, and these I/O devices 68 and 70 and antennas 73 and 74 operate as transmitters/receivers to perform wireless communications with the wireless field devices 60, 61, 62, 63, 64, and 71 via one or more wireless communication networks. The wireless communications between the field devices 60, 61, 62, 63, 64, and 71 (e.g., the transmitters and the control valve assembly) may be performed using one or more known wireless communication protocols, such as the WirelessHART® protocol, the Ember protocol, a WiFi protocol, an IEEE wireless standard, etc. Still further, the I/O devices 68 and 70 may implement protocol stack operations used by these communication protocols to receive, decode, route, encode, and send wireless signals via the antennas 74 and 73 to implement wireless communications between the process controller 11 and the field devices 60, 61, 62, 63, 64, and 71.

As illustrated in FIG. 1, the process controller 11 conventionally includes a processor 23 that implements or oversees one or more process control routines (or any module, block, or sub-routine thereof) stored in a memory 24. The process control routines stored in the memory 24 may include or be associated with control loops being implemented within the process plant. Generally speaking, and as is generally known, the process controller 11 executes one or more control routines and communicates with the field devices 15, 16, 17, 18, 19, 20, 21, 22, 60, 61, 62, 63, 64, and 71, the workstations 13 and the data historian 12 to control a process in any desired manner(s).

Figure 3:
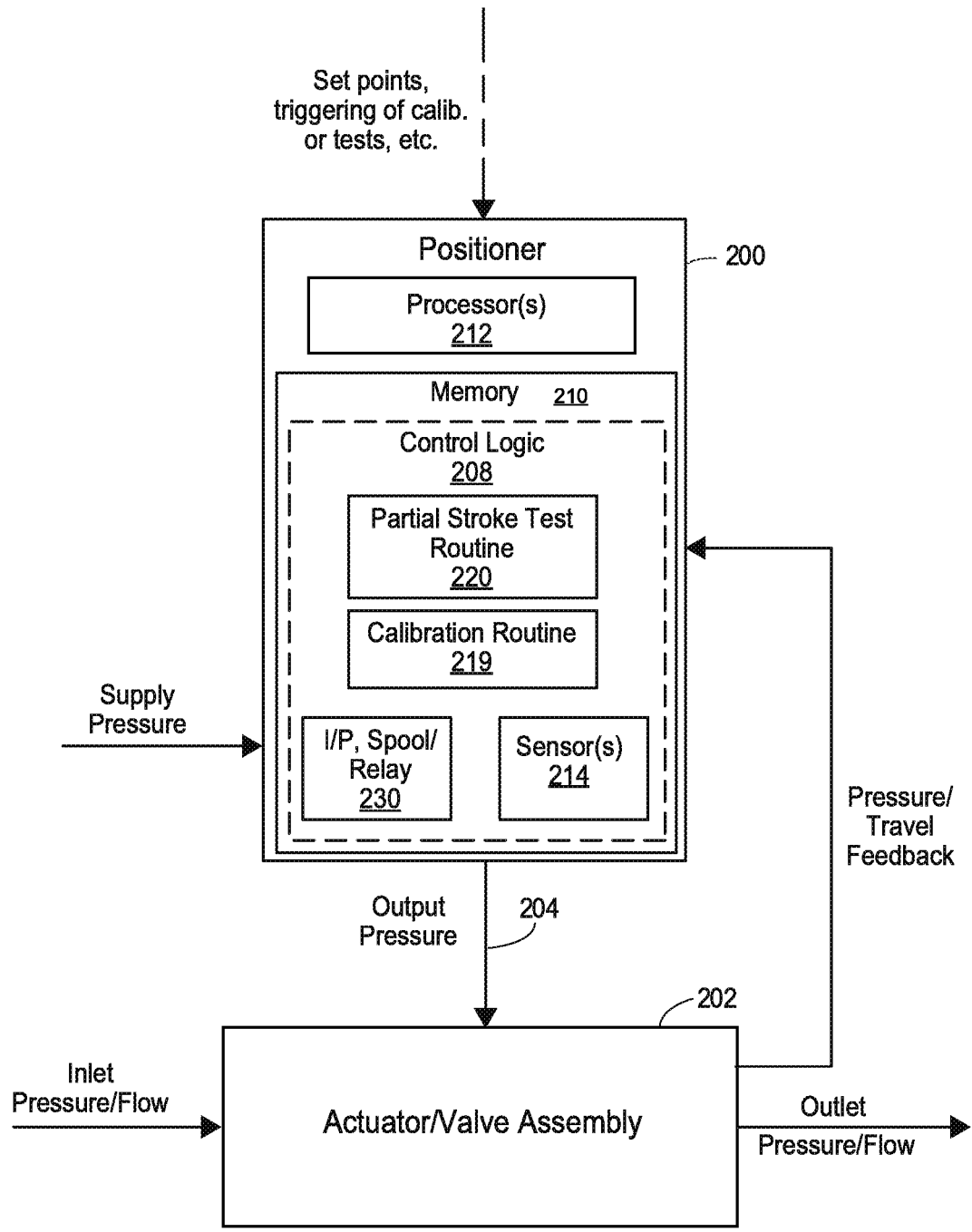
FIG. 3 illustrates an example positioner configured to calibrate and/or test a actuator/valve assembly.

Any one of the field devices 15, 16, 17, 18, 19, 20, 21, 22, and 71 illustrated in FIG. 1, such as control valve assemblies or valve positioners, and/or other suitable types of field devices utilized by a process plant, may be calibrated using pressure control techniques and/or perform tests, such as Partial Stroke Tests (PSTs), with pressure control techniques, as described herein. The process controller 11 and/or a valve positioner coupled to the respective field device 15, 16, 17, 18, 19, 20, 21, 22, and 71 may control a pressure supplied to an actuator and measure a pressure within the actuator to determine an I/P bias and/or other suitable bias of the valve controller. The process controller 11 and/or a valve positioner may also ramp a pressure within the actuator up or down to a pressure limit to test a travel of the actuator (e.g., a travel of a piston of the actuator). FIG. 3 illustrates an example of such a positioner and actuator in further detail.

Positioners and Valve/Actuator Assemblies

In some implementations, one or more of the field devices 15, 16, 17, 18, 19, 20, 21, 22, and 71 illustrated in FIG. 1, may be valve positioners coupled to ESVs or other valve/actuator assemblies associated with a SIS. In such cases, the ESVs or other valve/actuator assemblies may primarily be on/off devices characterized by loose connections, significant lost motion, high seal friction, and stick-slip dynamics. Examples of such characteristics are further illustrated in FIGS. 2A, 2B, and 2C.

Figure 2A:
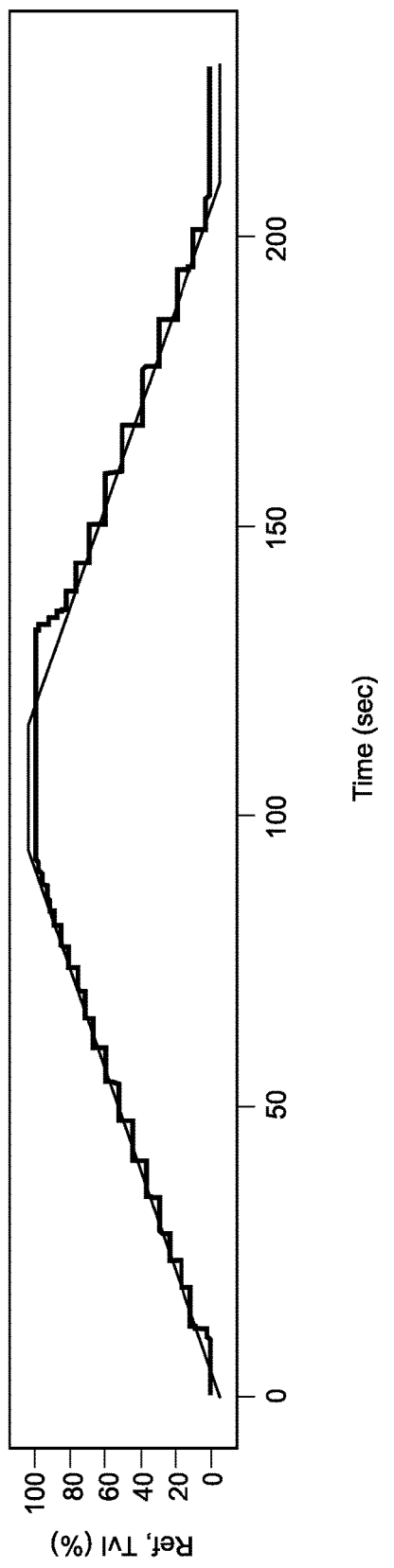
FIGS. 2A, 2B, and 2C illustrate example stick slip dynamics of an emergency shutdown valve which can be implemented in the example process control system illustrated in FIG. 1.

Specifically, FIG. 2A is an example plot of relative travel vs. time for a one hundred second scan of a pneumatic valve actuator during which the travel of the pneumatic valve actuator is controlled. As can be seen in FIG. 2A, the travel of the pneumatic valve actuator (bold line) is not a smooth curve or line. Rather, as a function of time, the travel of the pneumatic valve actuator includes various moments of sticking, represented by the flat line segments in the travel curve of FIG. 2A, followed by moments of slipping of the pneumatic valve, represented by vertical line segments or steps in the travel curve of FIG. 2A.

Figure 2B:
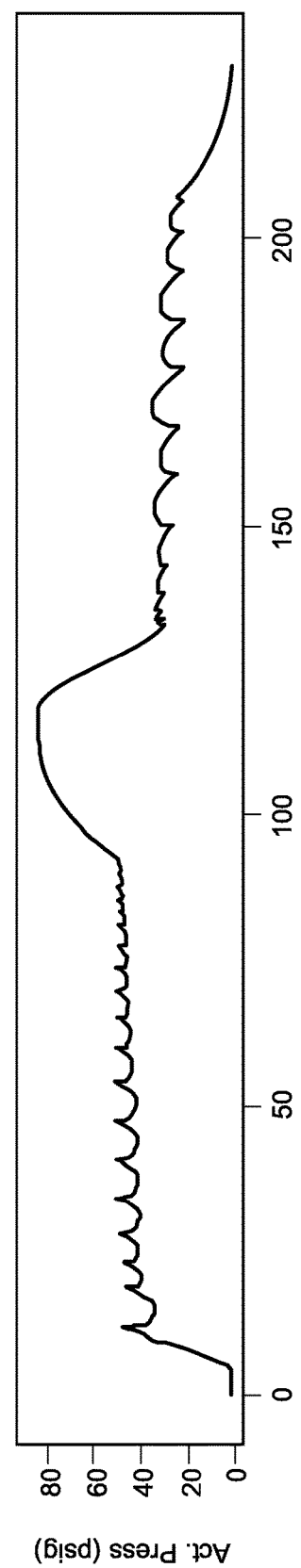

FIG. 2B illustrates a corresponding plot of actual pressure (within the pneumatic valve actuator) vs. time for the same one hundred second scan that is described with reference to FIG. 2A. At each of the moments of slipping of the pneumatic valve actuator, the pressure within the actuator dramatically shifts up or down due to a sudden change in volume within the actuator. These stick and slip dynamics are further illustrated in FIG. 2C, which includes a parametric plot of the travels and pressures illustrated in FIGS. 2A and 2B (e.g., relative travel vs. actual pressure).

In some implementations, one or more of the field devices 15, 16, 17, 18, 19, 20, 21, 22, and 71 illustrated in FIG. 1 may include positioners or servo controllers coupled to and controlling valve/actuator assemblies other than ESVs. These other valve/actuator assemblies, such as compressor anti-surge valves or vent valves, may primarily be configured for precision operations, such as throttling and control, in contrast to ESVs primarily configured as on/off devices.

Specifically, one or more of the field devices 15, 16, 17, 18, 19, 20, 21, 22, and 71 illustrated in FIG. 1 may be positioners including spool valves. These spool valves included in the positioners may be characterized by a balanced design allowing the spool valves to move under extreme conditions, such as very high pressures. As such, positioners including spool valves may operate similarly at many different pressures, and positioners including spool valves may be calibrated and/or may perform tests at many different pressures or within a range of pressures.

In some cases, positioners including spool valves may utilize end-point pressure control techniques. In particular, when a controlled valve is seated at an end-point (e.g., fully open or fully closed), this type of positioner may control a pressure within or supplied to the controlled valve ("end-point pressure control") such that the controlled pressure is below or above a maximum or minimum pressure, respectively, that can be supplied to the controlled valve. In this manner, the positioner may more quickly unseat or move the controlled valve from the end-point as compared to scenarios in which the pressure is at the maximum or minimum pressure. Positioners described below may, in these cases, perform calibrations during end-point pressure control scenarios such that the positioners and corresponding controlled valves are calibrated while the controlled valves are in service (e.g., without disrupting a process).

One or more of the field devices 15, 16, 17, 18, 19, 20, 21, 22, and 71 illustrated in FIG. 1 may also be positioners including a pneumatic relay, or poppet valve driven by a diaphragm assembly. This type of positioner may be characterized by an unbalanced design such that a bias of the positioner is dependent on the pressure supplied to or within a controlled valve. Positioners including pneumatic relays may perform calibrations (e.g., of an I/P bias) at a middle pressure value within a range of pressure values, such as a range of pressure values defined by a bench set, in an implementation.

Figure 2C:
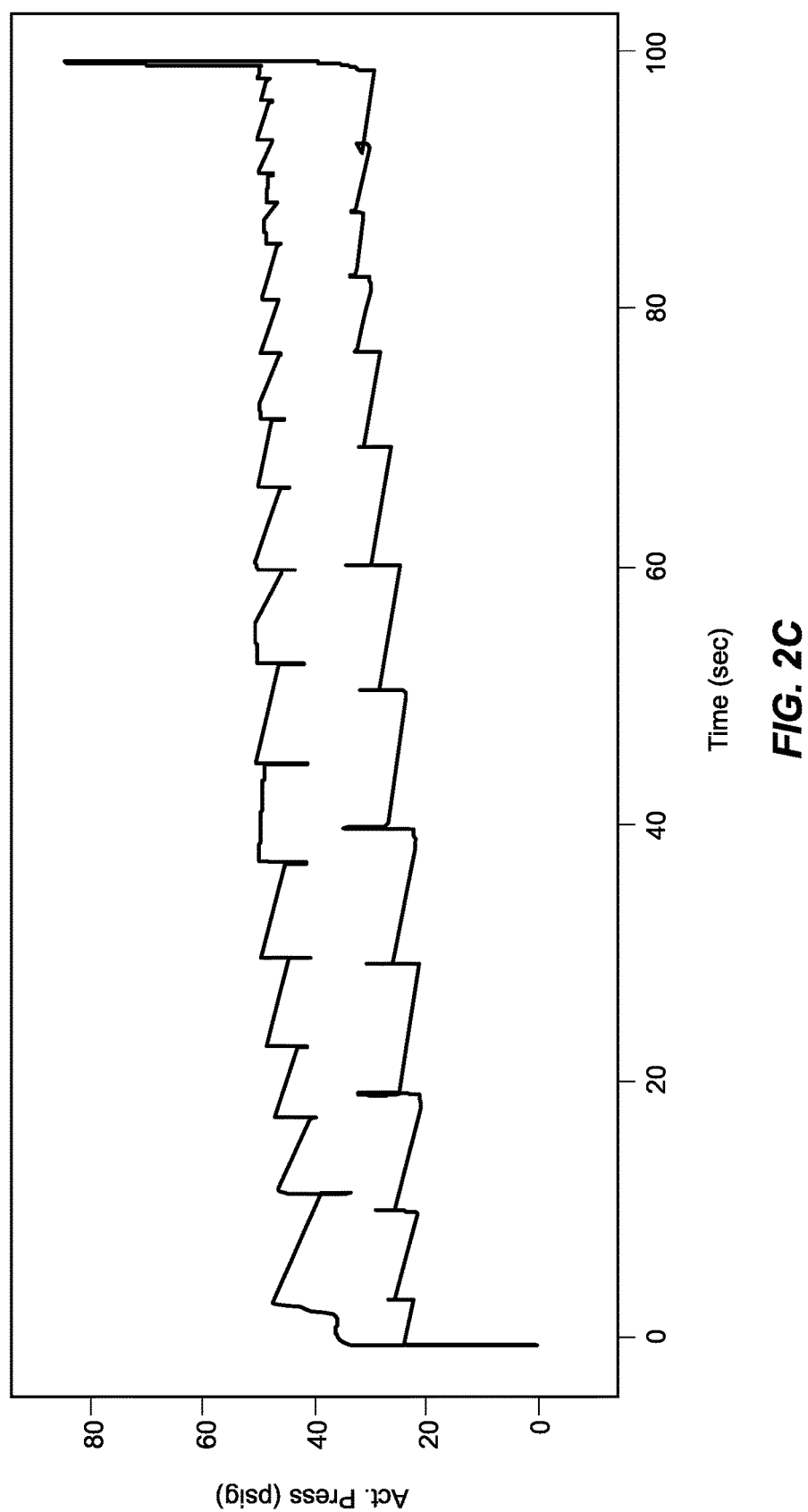

Turning now to FIG. 3, one potential example of a field device (such as field devices 15, 16, 17, 18, 19, 20, 21, 22, and 71 illustrated in FIG. 1) is shown that includes an example positioner 200 that may control an actuator/valve assembly 202, such as an actuator/valve assembly exhibiting behavior as illustrated in FIGS. 2A, 2B, and 2C or another suitable actuator/valve assembly (a compressor anti-surge valve, a vent vale, etc.). In some cases, the positioner 200 may be configured to perform partial stroke tests, or other tests, on the actuator/valve assembly 202. To this end, the positioner 200 may be pneumatically and/or electrically coupled to the actuator/valve assembly 202 via a coupling 204 and communicatively coupled to a controller, such as process controller 11 in FIG. 1.

In particular, the positioner 200 may control a pressure within or supplied to the actuator/valve assembly 202 based on signals (e.g., analog or digital) received from the controller and/or based on control logic 208. For example, the controller may generate various signals (e.g., 4-20 mA signals) indicative of set point values or requests to perform calibrations and/or tests. Triggered by these signals from the controller, the positioner 200 may generate a pneumatic output to control the actuator/valve assembly 202 based on the control logic 208 stored on one or more non-transitory memories 210 of the positioner 200. The control logic 208 may implement at least a portion of one or more control loops and may be executed by one or more processors 212 of the positioner 200. The positioner 200 may, in some implementations, generate an internal current signal based on a current signal received from the controller (e.g., a 4-20 mA signal). This internal current may be supplied to a current to pressure converter (I/P) and spool valve/relay component 230 of the positioner 200. Based on the internal current signal, the I/P and spool valve/relay component 230 may generate the output pressure supplied to the actuator/valve assembly 202 via the pneumatic coupling 204.

Control loops implemented by the control logic 208 may receive feedback pressure and/or travel values from one or more sensors 214 in the positioner 200 and/or any number of other sensors coupled to the positioner 200 and/or to the actuator/valve assembly 202. These sensors 214 may provide pressure values and/or travel values to the control logic 208. Further details of example control loops that may, at least partially, be implemented by the example positioner 200 are described with reference to FIG. 11.

The control logic 208 may include a calibration routine 219. When executed by the one or more processors 212, the calibration routine 219 may cause the positioner 200 to control a pressure in or supplied to the actuator/valve assembly 202. In some cases, the calibration routine 219 may cause the positioner 200 to control a pressure in or supplied to the actuator/valve assembly 202 at constant volume, during end-point pressure control, at a middle pressure value in a range of pressure value, or at any other suitable time or state of the actuator/valve assembly 202. In particular, the calibration routine 219 may operate in conjunction with the control logic 208 (as depicted in FIG. 3) or as a standalone routine to provide control signals to the I/P and spool valve/relay component 230. These signals may cause the I/P and spool valve/relay component 230 to control a pressure in or supplied to the actuator/valve assembly 202 while the calibration routine 219 adjusts an I/P bias or other suitable bias of the positioner 200. The calibration routine 219 may adjust the I/P bias by replacing a nominal bias with an adjusted bias such that the difference between the adjusted bias and the nominal bias is accounted for in future control of the actuator/valve assembly 202. Further details of an example method for calibrating a positioner with pressure control, which example method may be at least partially implemented by the calibration routine 219, are discussed with reference to FIG. 4.

In some implementations, the I/P and spool valve/relay component 230 of the positioner 200 may feedback a position of a spool valve and/or pneumatic relay of the I/P and spool valve/relay component 230 to the control logic 208. The control logic 208 may utilize such a feedback in a damping term of a control loop, for example. To utilize this feedback, the calibration routine 219 may determine and/or adjust a null state of the spool valve or pneumatic relay, or a "minor loop feedback bias," in addition to or instead of an I/P bias. For example, a travel of a pneumatic relay may be between 9,000 counts and 19,000 counts with a nominal operating point of 13,000 counts. The feedback to the control logic 208 in this example may be a normalized value dependent on the measured travel (e.g., in counts) of the pneumatic relay minus the nominal operating point. Such a feedback signal is zero around a null state of the pneumatic relay and goes positive or negative depending on the travel of the pneumatic relay, where the null state may be adjusted by the calibration routine 219.

The control logic 208 may also include a partial stroke test routine 220. When executed by the one or more processors 212, the partial stroke test routine 220 may cause the actuator/valve assembly 202 to undergo a partial stroke test to test the operation of the actuator/valve assembly 202. For example, the partial stroke test routine 220 may operate in conjunction with the control logic 208 (as depicted in FIG. 3) or as a standalone routine to provide control signals to the I/P and spool valve/relay component 230. These signals may cause the I/P and spool valve/relay component 230 to ramp a pressure in or supplied to the actuator/valve assembly 202 to cause a travel of the actuator/valve assembly 202. Further details of an example method for performing a partial stroke test, which example method may be at least partially implemented by the partial stroke test routine 220, are discussed with reference to FIG. 8.

As discussed above, the controller may trigger or otherwise cause the positioner 200 to initiate calibrations and/or to test (e.g., perform a partial stroke test), or the positioner 200 itself may initiate such calibrations or tests at periodic or otherwise determined times. Additionally, in some implementations, the positioner 200 or a separate device, module, or component operatively coupled to the positioner 200 may include one or more buttons, switches, control panels, touchscreens, or other interfaces allowing a human operator to manually initiate calibrations or test at the positioner 200 (e.g., by the pushing of buttons, entering of codes, etc.). In some cases, a human operator may also override previously initiated calibrations or partial stroke tests (e.g., initiated by the controller 206) so as to stop, cancel, or otherwise modify calibrations or partial stroke tests in certain situations, such as emergency, testing, maintenance, or other situations.

Although FIG. 3 illustrates the processors 212, memories 210, control logic 208, calibration routine 219, and partial stroke test routine 220 as components of the positioner 200, the controller may alternatively, or additionally, include at least some components substantially similar to the processors 212, memories 210, control logic 208, calibration routine 219, and partial stroke test routine 220. In fact, in some implementations, the controller may implement all or most of the calibration and testing functionality discussed with reference to FIGS. 4 and 8 to control pressures within the actuator/valve assembly 202 and/or to perform partial stroke tests on the actuator/valve assembly 202. Generally, the functionality associated with controlling a pressure within the actuator/valve assembly 202 and/or performing partial stroke tests on the actuator/valve assembly 202 may be distributed in any suitable manner between the controller and the positioner 200.

Calibrating Positioners

Figure 4:
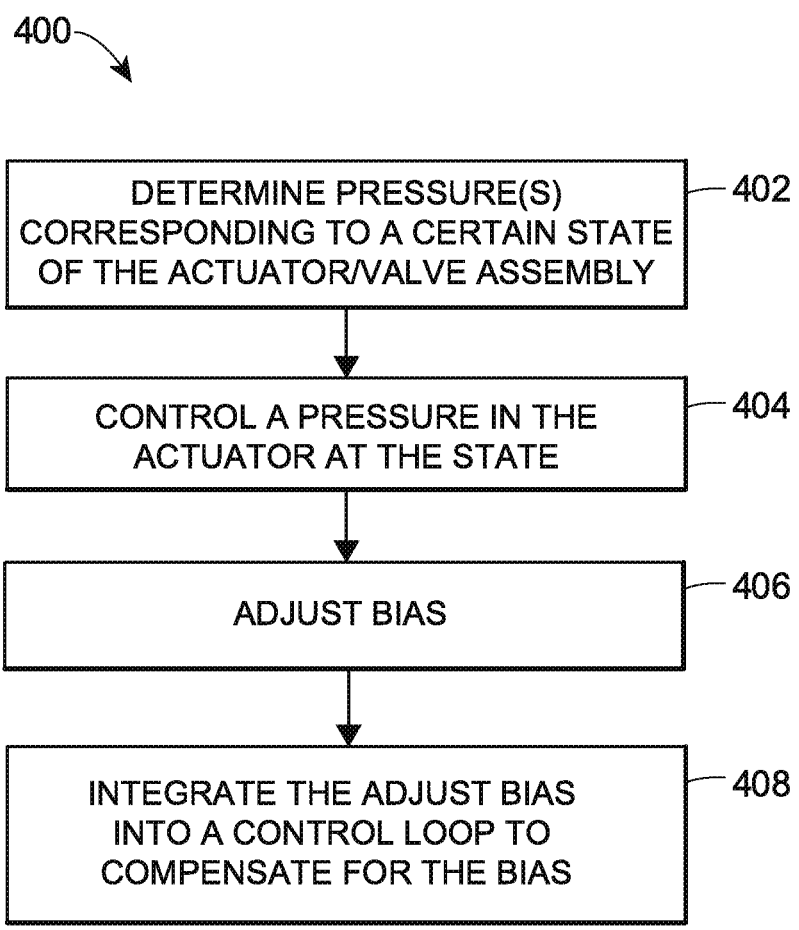
FIG. 4 illustrates an example flow diagram for determining a bias of a positioner, such as the positioner illustrated in FIG. 3.

FIG. 4 is a flow diagram of an example method 400 for calibrating a positioner, such as the positioner 200, using pressure control techniques. Specifically, the example method 400 may be utilized to determine a bias, such as a current to pressure (I/P) bias or minor loop feedback bias, of the positioner 200. For ease of discussion, the components of the example positioner 200 may be referenced in the description of the method 400, but, generally, the method 400 may be utilized to calibrate any suitable device coupled to an actuator/valve assembly and may be implemented by any suitable combination of a controller and the device coupled to the actuator/valve assembly.

The positioner 200 may determine pressures corresponding to a particular state of the actuator/valve assembly 202, such as one or more hard stops or end-points, travel stops, stationary positions, middle points of a range of pressures (e.g., defined in a bench set), etc. (block 402). In some cases, a bench set of an actuator may define a pressure range (e.g., three psig to fifteen psig) that corresponds to 0% to 100% travel of the actuator. In such cases, the positioner 200 may determine a pressure just below a low end of the pressure range or just above a high end of the pressure range. For example, for a bench set of three psig to fifteen psig, the positioner 200 may determine a pressure between zero and three psig to maintain a fixed volume at the low pressure end of the bench set of a pressure between fifteen and twenty psig to maintain a fixed volume at the high end of the bench set. In other cases when a bench set is not known, the positioner 200 may determine a pressure based on pre-determined or approximated value. For example, the positioner 200 may determine a pressure of 0+2=2 psig to maintain a fixed volume at an estimated low end of actuator travel or a pressure of 20−2=18 psig to maintain a fixed volume at an estimated high end of actuator travel.

The positioner 200 may determine such pressure during a scenario in which end-point pressure control techniques are being utilized. For example, when the positioner 200 may perform end-point pressure control to prevent a pressure within the actuator/valve assembly 202 from reaching a maximum or minimum possible value of the pressure. The positioner 200 may determine a pressure value slightly below a maximum pressure value or slightly above a minimum pressure value while the actuator/valve assembly 202 is seated at an end-point (e.g., fully open or fully closed).

In still other cases, the positioner 200 may determine a pressure value at near the middle or at another relative position within a range of pressure values. For example, when the positioner 200 includes a pneumatic relay, the positioner 200 may determine a particular pressure somewhere in between pressure limits (e.g., defined by a bench set). The determined pressure may be a pressure value in the middle of the range (e.g., having the same absolute value of pressure difference between the middle value and both a high pressure limit and a low pressure limit). However, the positioner 200 may determine a pressure at any suitable position in the range of pressures, such as a ten percent relative pressure, twenty percent relative pressure, etc. The positioner 200 may even determine multiple pressure values in a range of pressures so as to determine multiple different bias values for a pneumatic relay.

Returning to FIG. 4, the positioner 200 may control a pressure in the actuator/valve assembly 202 while maintaining the actuator/valve assembly 202 at the determined particular state of the actuator/valve assembly 202 (block 404). That is, the positioner 200 may maintain a constant volume within the actuator/valve assembly 202 while a pressure within the actuator/valve assembly 202 is controlled, maintain a pressure within the actuator/valve assembly 202 near an end-point of the actuator/valve assembly 202 (e.g., during end-point pressure control), or maintain a pressure within the actuator/valve assembly 202 at a particular pressure value in a range of pressure values. For example, the positioner 200 may control a pressure at a constant volume by controlling the pressure within the actuator/valve assembly 202 according to a set point pressure value that is above or below the determined upper or lower pressure limit, respectively, determined at block 402. Alternatively or additionally, the positioner 200 may control a pressure within a range of pressures or at a pressure value utilized during end-point control (e.g., while the actuator/valve assembly 202 is near an end-point, such as fully open) by controlling the pressure within the actuator/valve assembly 202 according to a set point pressure value that is in the pressure range (e.g., in the middle of the range) or below/above a maximum or minimum pressure, respectively, and determined at block 402.

While the pressure is controlled at the particular state of the actuator/valve assembly 202, the positioner 200 may adjust a bias of the positioner 200 based on the set point, a feedback of an actual pressure within the actuator/valve assembly 202, and/or a nominal or default bias of the positioner 200 (block 406). In some implementations, the positioner 200 may adjust a default or nominal bias (e.g., existing values stored in the positioner 200 or default values provided to the positioner 200) until a measure of error in the pressure over time satisfies a convergence criterion (e.g., is at or below a threshold for a certain period of time). The measure of error may be at least partially based on a difference between the feedback of an actual pressure within the actuator/valve assembly 202 and the set point. The measure of error may, at least in some implementations, correspond to an integral term in a proportional-integral-derivative (PID) controller integrated into the control logic 208.

The positioner 200 may update or integrate a bias of the positioner 200 (e.g., the nominal or default bias) according to the adjustments made at block 406 (block 408), or the positioner 200 may replace a default bias with an adjusted bias based on the adjustments at block 406. This update/integration/replacement may ensure that subsequent control of the actuator/valve assembly 202 accounts for a most recently adjusted bias of the positioner 200. For example, before placing the positioner 200 in service, an operator or the control logic 208 may configure the positioner 200 with a default or nominal bias (e.g., by setting the travel set point to 50% and turning on a travel integrator). Then, the positioner 200 may determine an adjusted measure of bias of the positioner 200 as described above, and the positioner 200 may update the default or nominal bias according to the adjusted measure of bias. Thus, the positioner 200 may refine a default bias or other currently used bias at suitable times and/or over time to compensate for changes in the bias due to temperature, wear, aging of components, etc.

Figure 5:
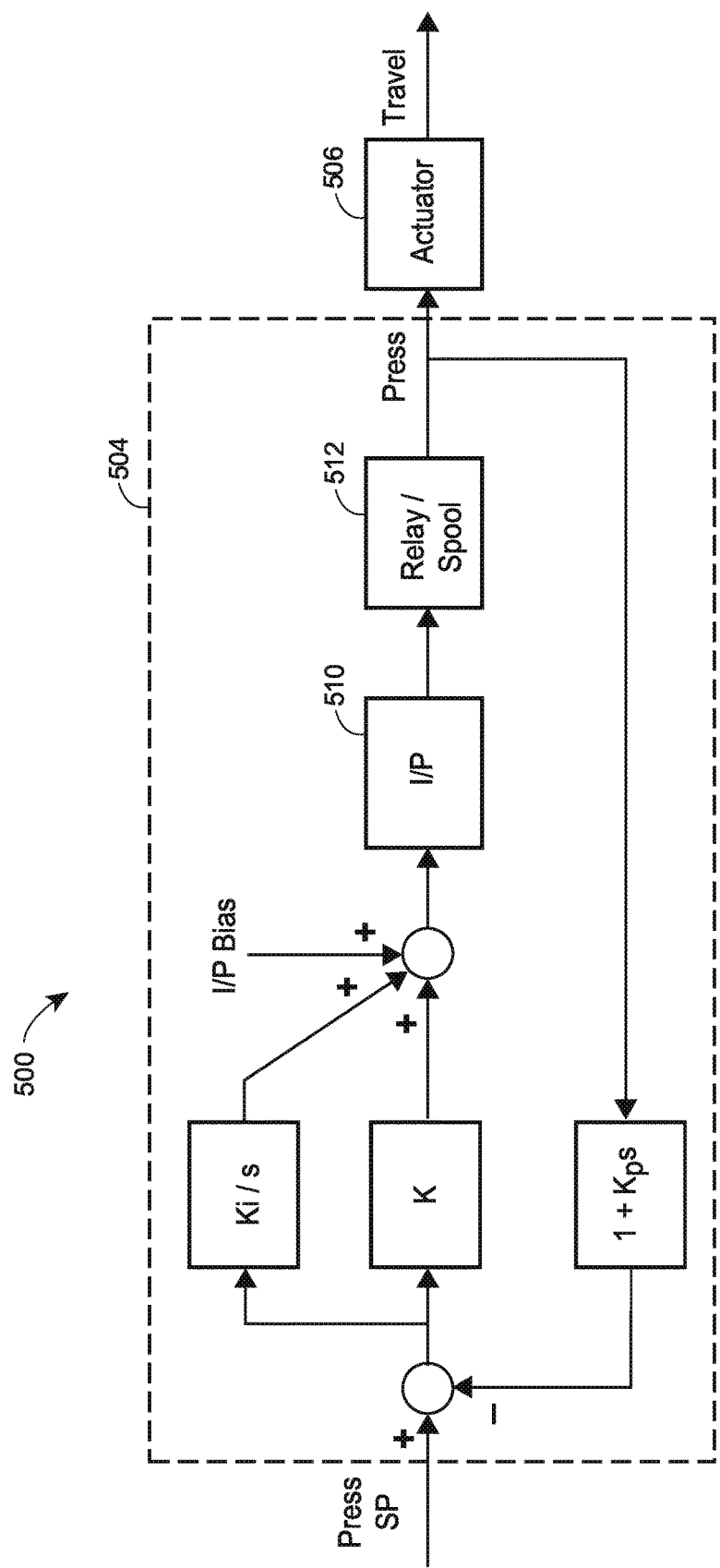
FIG. 5 illustrates a block diagram of an example pressure control loop which can be, at least partially, implemented by the positioner illustrated in FIG. 3.

FIG. 5 illustrates an example control loop 500 utilizing a measure of I/P bias, which measure of I/P bias may be generated according to the method 400. The controller and/or positioner 200 may implement at least a portion of the control loop 500. Specifically, the positioner 200 may implement a portion 504 of the control loop 500. In other implementations, the functionality of the portion 504 of the control loop 500 may be divided in any suitable manner between the positioner 200 and the controller.

The positioner 200 may receive pressure feedback values indicative of pressures in or supplied to an actuator 506, such as the actuator portion of actuator/valve assembly 202 in FIG. 3. The positioner 200 may also generate a control signal (e.g., a 0-1.42 mA control signal) indicative a pressure based on the pressure feedback values, a pressure set point (or "SP"), and various terms of the control loop 500 scheme. At least some of these various terms ("Ki/s," "K," etc.) may be added or otherwise combined with the pressure set point to generate the control signal, and, in particular, a measure of I/P bias may be added to a default bias to account for a bias of the positioner 200.

Upon receiving the control signal, an I/P component 510 and a relay/spool valve component 512 of the positioner 200 may cause a pressure to be supplied to the actuator 506 to produce a travel. Because the positioner 200 accounts for the I/P bias of the positioner 200, the positioner 200 may precisely control a pressure supplied to the actuator 506, at least within pre-defined tolerances. Such precision may be of importance when controlling high gain actuator/valve assemblies, because small changes in pressure may result in large travels of the high gain actuator/valve assemblies. This precision may also be of importance in other types of actuator/valve assemblies to calibrate actuator/valve assemblies, or devices such as positioners coupled to actuator/valve assemblies, while the actuator/valve assemblies are in service. Further, by adjusting a bias when a valve is at a hard stop (e.g., during end point pressure control scenarios), some implementations of positioners may adjust biases to account for temperature changes, wear, and aging of components without having to disturb a process (e.g., without having to shut down a particular line).

Testing Actuator/Valve Assemblies

In some implementations, controllers, such as the process controller 11, may trigger positioners, such as the positioner 200, to test actuator/valve assemblies. These tests, which may be required by certain regulatory bodies, may ensure that the actuator/valve assemblies are able to function (e.g., that an actuator or piston is able to travel). In particular, positioners, such as valve positioners coupled to ESVs, may perform partial stroke testing of actuator/valve assemblies to test an operation to open or close a valve without fully opening or closing the valve, so as to not disrupt a process.

Figure 6A:
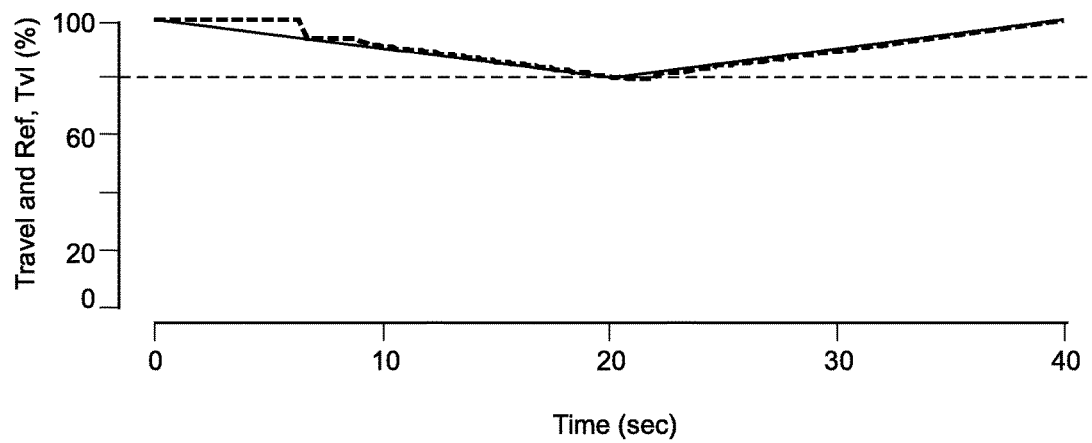
FIGS. 6A, 6B, and 6C illustrate various test result curves associated with a partial stroke test utilizing travel control.
Figure 6B:
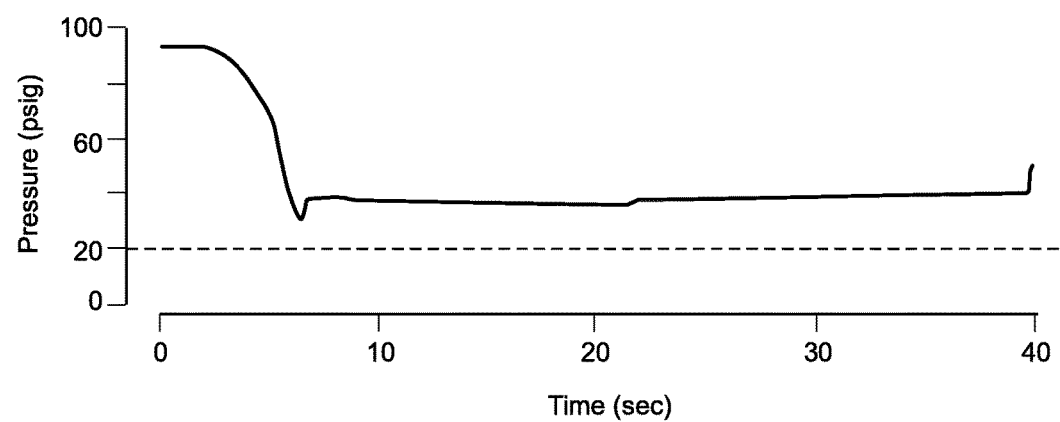
Figure 6C:
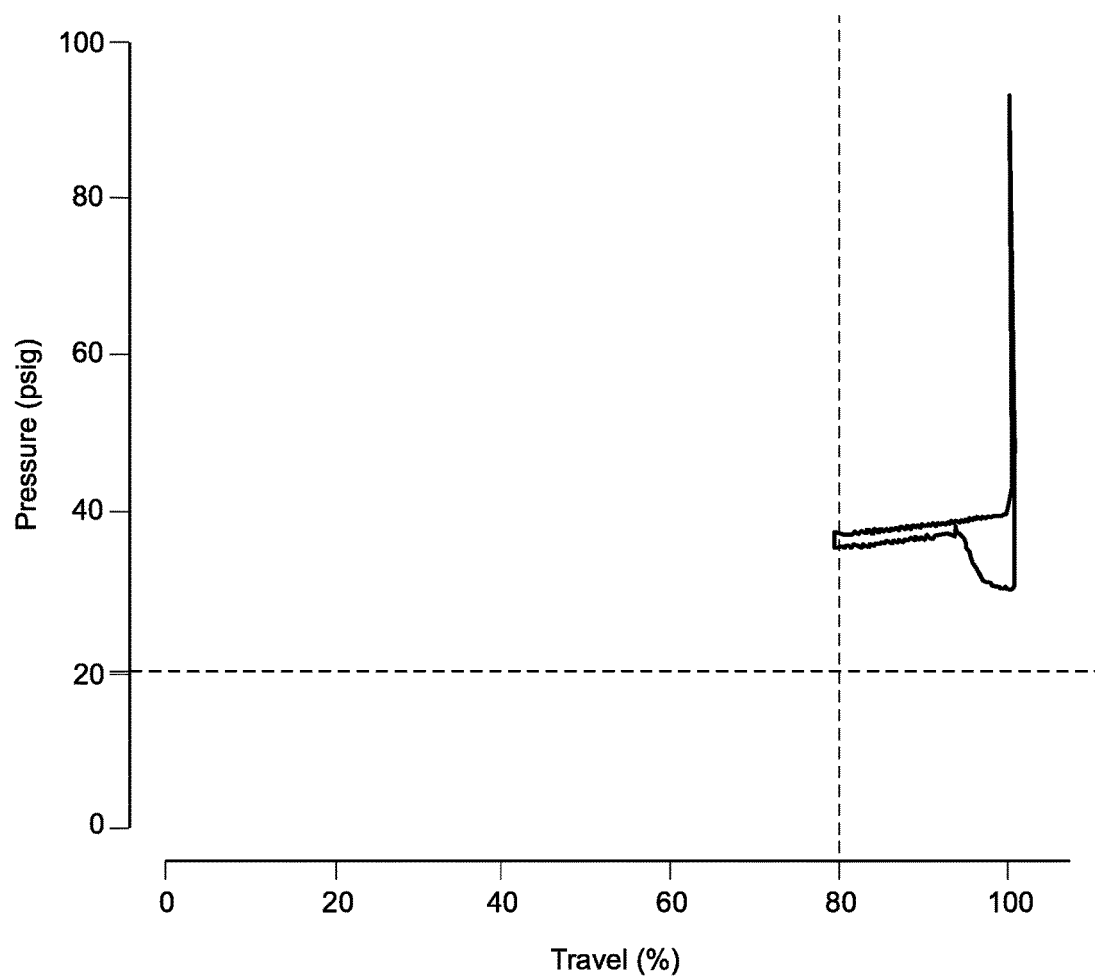

When performing partial stroke testing, positioners and/or controllers of the present disclosure may utilize pressure control techniques, as opposed to travel or position control techniques. In this manner, difficulties arising from loose connections, significant lost motion, high seal friction, and stick-slip dynamics may be substantially minimized (e.g., by reducing errors below a tolerance) and/or tests may be performed even when travel control functionality of device is not operational or is malfunctioning. To illustrate these points and contrast the current pressure control techniques for partial stroke tests, FIGS. 6A, 6B, and 6C illustrate a partial stroke test of a pneumatic valve actuator using travel control techniques. Although a specific pneumatic actuator exhibiting certain characteristics is discussed with reference to FIGS. 6A, 6B, and 6C, positioners may utilize pressure control to test any suitable types of valves, such as ESVs, compressor anti-surge valves, vent valves, etc.

In particular, FIG. 6A illustrates a plot of relative travel vs. time for a twenty second scan of the pneumatic valve actuator, or a travel set point ramp of 1%/second to 20% displacement. The plot illustrates an initial transition of the pneumatic valve actuator off of a hard stop, where, during this initial transition, is unloaded from a supplied pressure to an high end pressure of a bench set (or upper bench set). These dynamics are further illustrated in the pressure vs. time graph illustrated in FIG. 6B (corresponding to the same twenty second scan). The pressure exhibits dramatic shifts during the initial transition of the pneumatic valve actuator off of the hard stop.

Upon examining a parametric plot of the pressure vs. relative travel for the twenty second scan, as illustrated in FIG. 6C, one can see a clear non-symmetric (e.g., varying in time) behavior of the pneumatic valve actuator during the partial stroke test. Bernoulli and/or choked flow effect around the pressure sensor may cause this example behavior. That is, high velocities within the actuator may distort reading of the pressure sensor such that the reading does not accurately reflect actual pressures within the actuator. Because certain alerts (e.g., alerts corresponding to stuck valves) may be triggered off of a pressure threshold, distortions in pressure reading may result in false alerts. Generally, this type of behavior and/or other types of behavior occurring during travel control (e.g., resulting from stick and slip dynamics) may complicate the partial stroke test and may cause the pressure within the pneumatic valve actuator to go open-loop (e.g., out of the control of the controller) in the event of a stuck valve.

In contrast to partial stroke tests facilitated by travel control, the current techniques may utilize pressure control to perform partial stroke tests. In particular, a positioner may cause a pressure in a actuator/valve assembly to ramp from an initial pressure towards a minimum or maximum pressure value. When the minimum or maximum pressure is reached or when a travel of the actuator/valve assembly is detected, the positioner may cause the pressure to ramp back towards the initial pressure. In this manner, the pressure within the actuator/valve assembly is always under control.

Figure 7A:
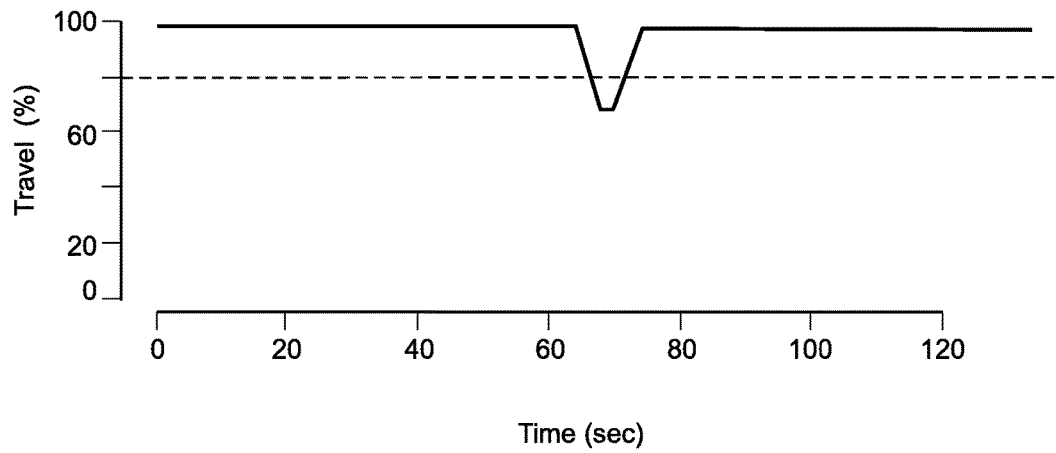
FIGS. 7A, 7B, and 7C illustrate various test result curves associated with an example partial stroke test utilizing pressure control technique, which can be performed by the positioner illustrated in FIG. 3.
Figure 7B:
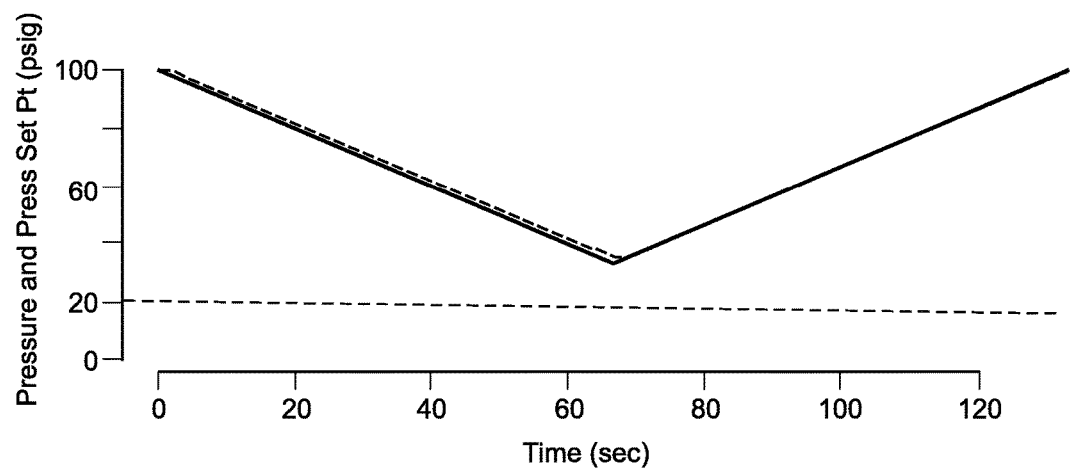
Figure 7C:
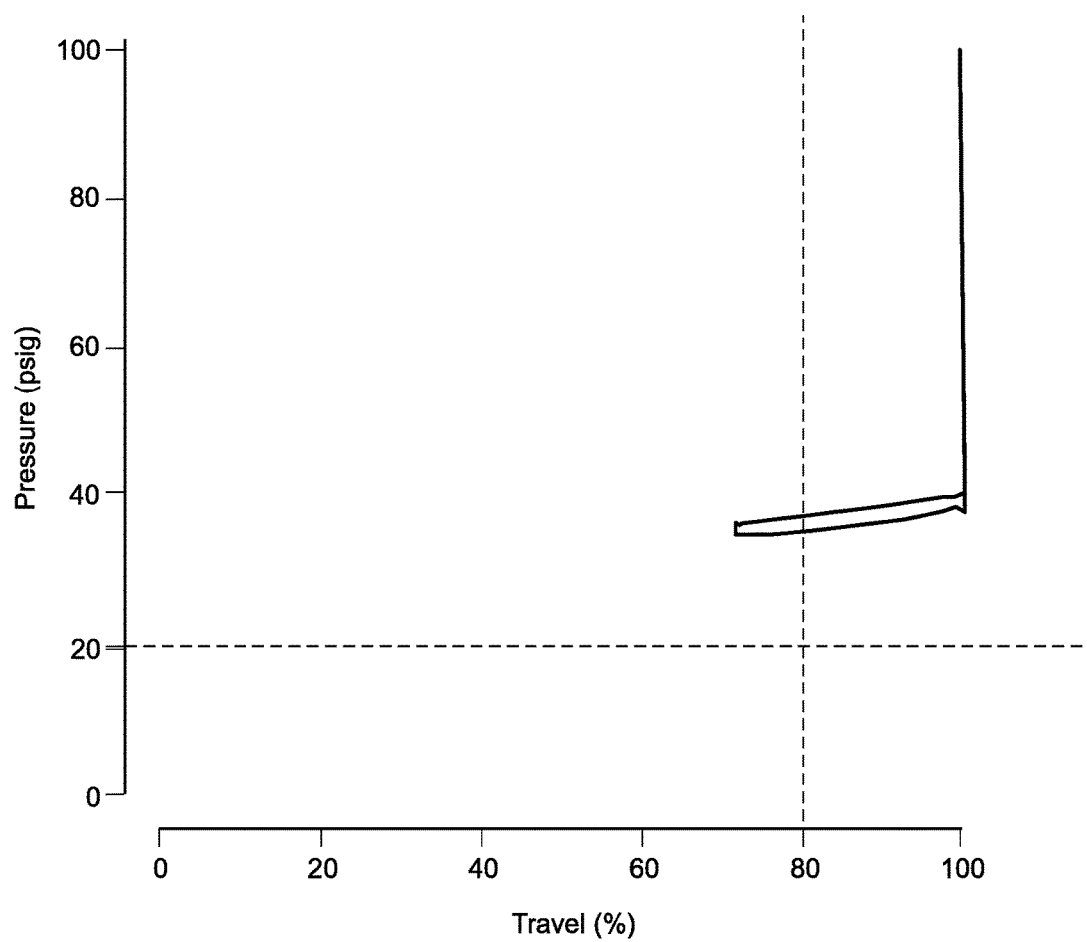

FIGS. 7A, 7B, and 7C illustrate a scenario in which a partial stroke test is performed using pressure control techniques. FIGS. 7A and 7B illustrate plots of relative travel vs. time and pressure (and pressure set point) vs. time, respectively, for a 1%/second ramping of a pressure within a pneumatic valve actuator similar to the pneumatic valve actuator tested in FIGS. 6A, 6B, and 6C. As can be seen in FIGS. 7A and 7B, the relative travel of the pneumatic valve actuator remains nearly constant while the pressure in the pneumatic valve actuator is ramped towards a pressure limit (e.g., twenty pounds per square inch gauge (psig), as illustrated by the dotted line in FIG. 7B).

At a certain time (around sixty-five seconds), the pneumatic valve actuator travels, and, at this time, the ramping of the pressure may be reversed back towards the initial pressure (before reaching the pressure limit, in this scenario). During the partial stroke test, even at times when the travel of the pneumatic valve actuator remained near constant, the pressure within the pneumatic valve actuator is under control, as further illustrated in FIG. 7C by a symmetric and smooth pressure and travel response of the pneumatic valve actuator.

Figure 8:
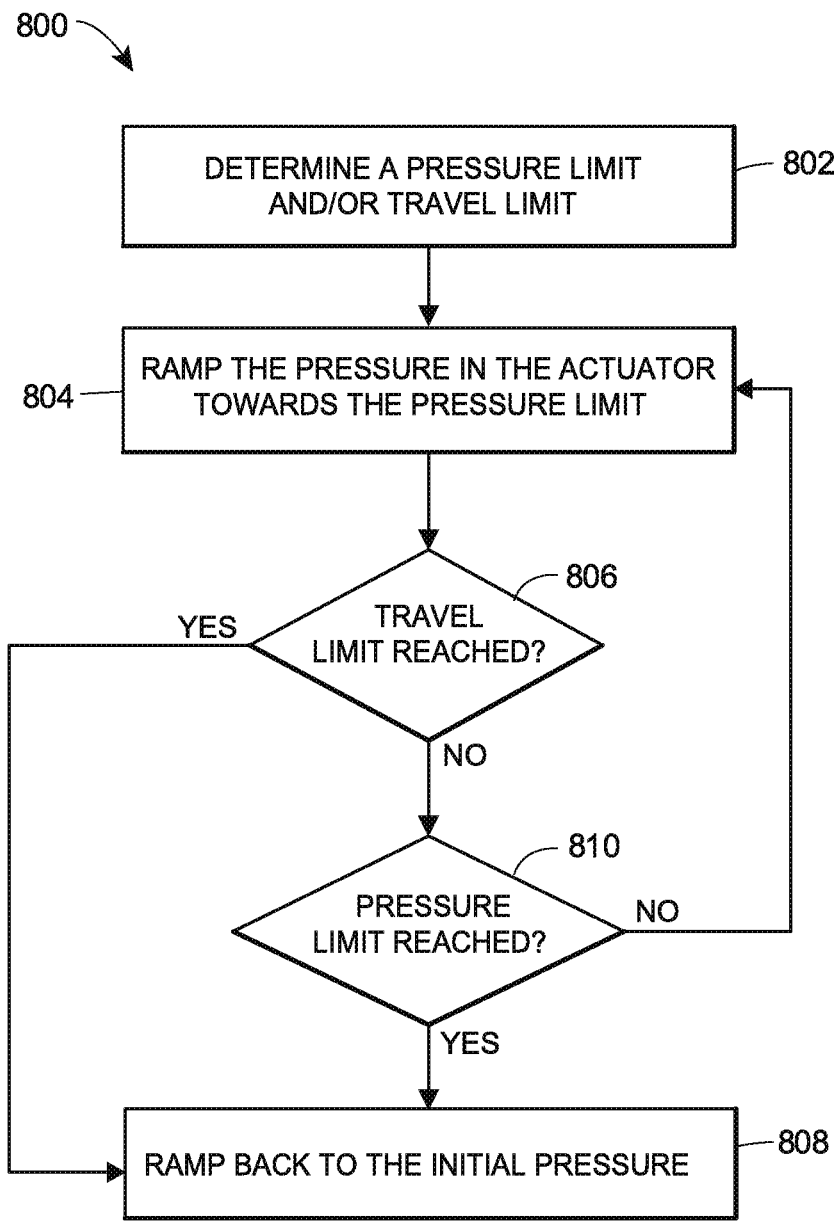
FIG. 8 illustrates an example flow diagram for testing an actuator/valve assembly with pressure control techniques, which can be performed by the positioner illustrated in FIG. 3.

FIG. 8 is a flow diagram of an example method 800 for testing an actuator/valve assembly, such as the actuator/valve assembly 202 in FIG. 3, with pressure control techniques. The method 800 may be implemented by a suitable combination of controllers and positioners, such as process controller 11 and positioner 200. For ease of discussion, the components of the example positioner 200, such as the partial stroke test routine 220, may be referenced in the description of the method 800, but, generally, the method 800 may be utilized by any suitable controller or positioner to test any suitable actuator/valve assembly.

The process controller 11 and/or positioner 200 may execute the partial stroke test routine 220 to determine a pressure limit and/or travel limit (block 802). The partial stroke test routine 220 may utilize the pressure and travel limits during a controlled ramping of a pressure within the actuator/valve assembly 202. In some implementations, the partial stroke test routine 220 determines the pressure limit to be a pre-configured pressure value programmed, or otherwise configured, in the partial stroke test routine 220. In other implementations, the partial stroke test routine 220 may retrieve the pressure limit from a data storage device (e.g., database) operatively connected to the process controller 11, or the partial stroke test routine 220 may even determine the pressure limit in near real-time (e.g., when executing to perform a partial stroke test) based on user input into the process controller 11, current or historical pressure and/or travel feedback values, etc.

The pressure limit (e.g., programmed as a parameter in the partial stroke test routine 220) may define a pressure such that the actuator/valve assembly 202 is expected to move (e.g., based on prior bench tests) as the partial stroke test routine 220 ramps a pressure within the actuator/valve assembly 202 to the pressure limit. In some cases, the pressure limit defines a pressure such that the actuator/valve assembly 202 does not move past a maximum travel or relative travel (e.g., 20%) when a pressure within the actuator/valve assembly 202 is ramped to the pressure limit. In this manner, the partial stroke test routine 220 may test the operation of the actuator/valve assembly 202 while preventing disruption of a process, which disruption may occur when the actuator/valve assembly 202 travels past the maximum travel.

The pressure limit may be an upper pressure limit or a lower pressure limit depending on the configuration of the actuator/valve assembly 202. For example, if the actuator/valve assembly 202 is a normally open ESV, the positioner 200 may utilize a lower pressure limit, whereas the positioner 200 may utilize an upper pressure limit for a normally closed ESV.

The partial stroke test routine 220 ramps a pressure within the actuator/valve assembly 202 from an initial pressure within the actuator/valve assembly 202 towards the pressure limit (block 804). For example, the partial stroke test routine 220 and/or other components of the control logic 208 may implement at least portions of a pressure control loop, such as one of the pressure control loops discussed with reference to FIGS. 5 and 11, to control the pressure to ramp towards the pressure limit.

The partial stroke test routine 220 may then determine if the actuator/valve assembly 202 has reached the travel limit (block 806). For example, one or more sensors sensing travel of the actuator/valve assembly 202 may feedback data indicative of a travel or relative travel (e.g., percentage of total travel) to the positioner 200. In some implementations, the positioner 200 may continue to ramp the pressure until a certain percentage of total travel of the actuator/valve assembly 202 is detected (e.g., a 20% relative travel limit), whereas, in other implementations, the positioner 200 may continue to ramp the pressure until any amount (e.g., any finite amount) of travel of the actuator/valve assembly 202 is detected.

If the travel limit of the actuator/valve assembly 202 is reached, the flow may continue to block 808, where the partial stroke test routine 220 may reverse the ramping of the pressure such that the pressure is ramped back towards the initial pressure. However, if no travel, or a relative travel less than the travel limit, is detected, the flow may continue to block 810. At block 810, the partial stroke test routine 220 may determine if the pressure limit has been reached. If the pressure limit has been reached, the flow may continue to block 808, but, if the pressure limit has not been reached, the flow may revert to block 804 where the ramping of the pressure continues towards the pressure limit.

In some implementations, instead of simply reversing the ramping of the pressure upon a detection of travel or a detection of a relative amount of travel, the positioner 200 (e.g., the partial stroke test routine 220) may control the pressure in the actuator/valve assembly 202 to: (i) step back towards the initial pressure by a finite amount, and (ii) then continue ramp back towards the initial pressure. That is, the positioner 200 may near instantaneously reinitialize the pressure before ramping the pressure back towards the initial pressure. In this manner, the positioner 200 may minimize further drifting of the actuator/valve assembly 202 past the detected travel or amount of relative travel.

Figure 9A:
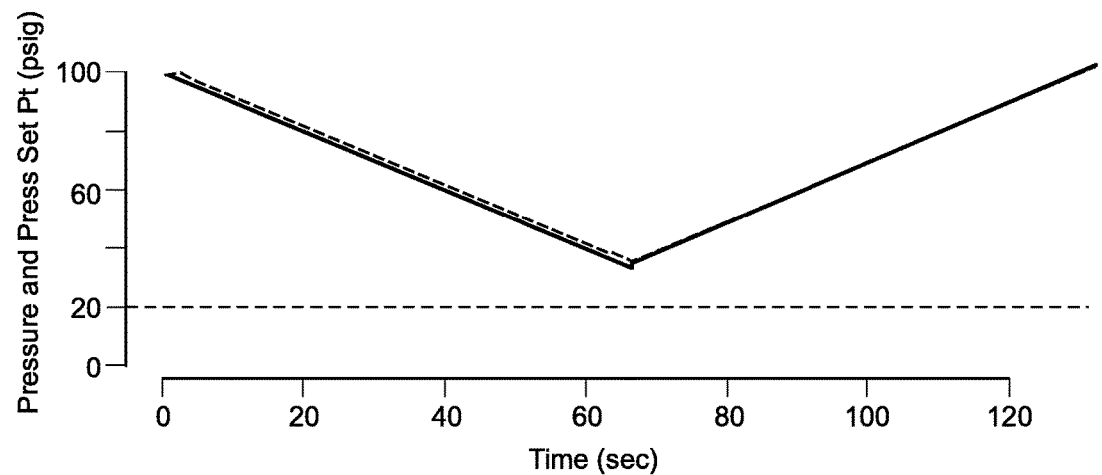
FIGS. 9A, 9B, and 9C illustrate various test result curves associated with another example partial stroke test utilizing a stepped pressure, which can be performed by the positioner illustrated in FIG. 3.
Figure 9B:
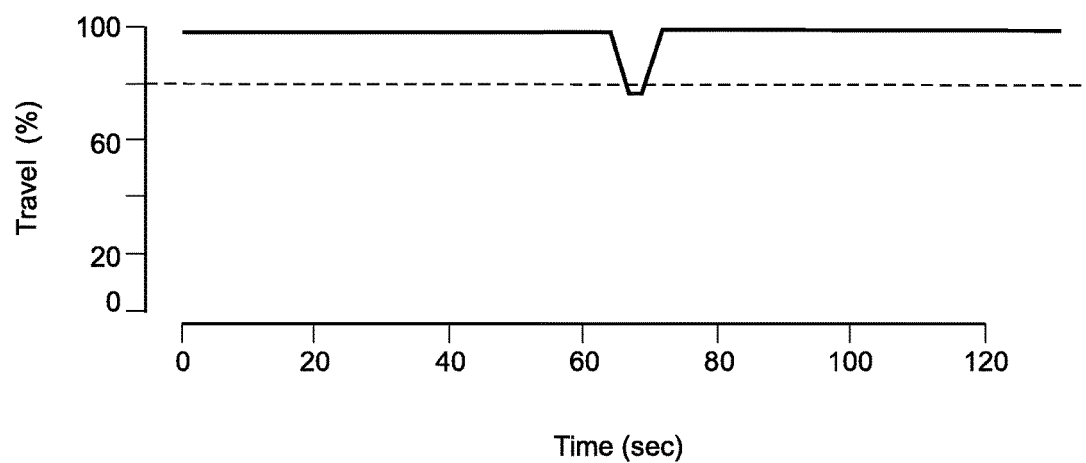
Figure 9C:
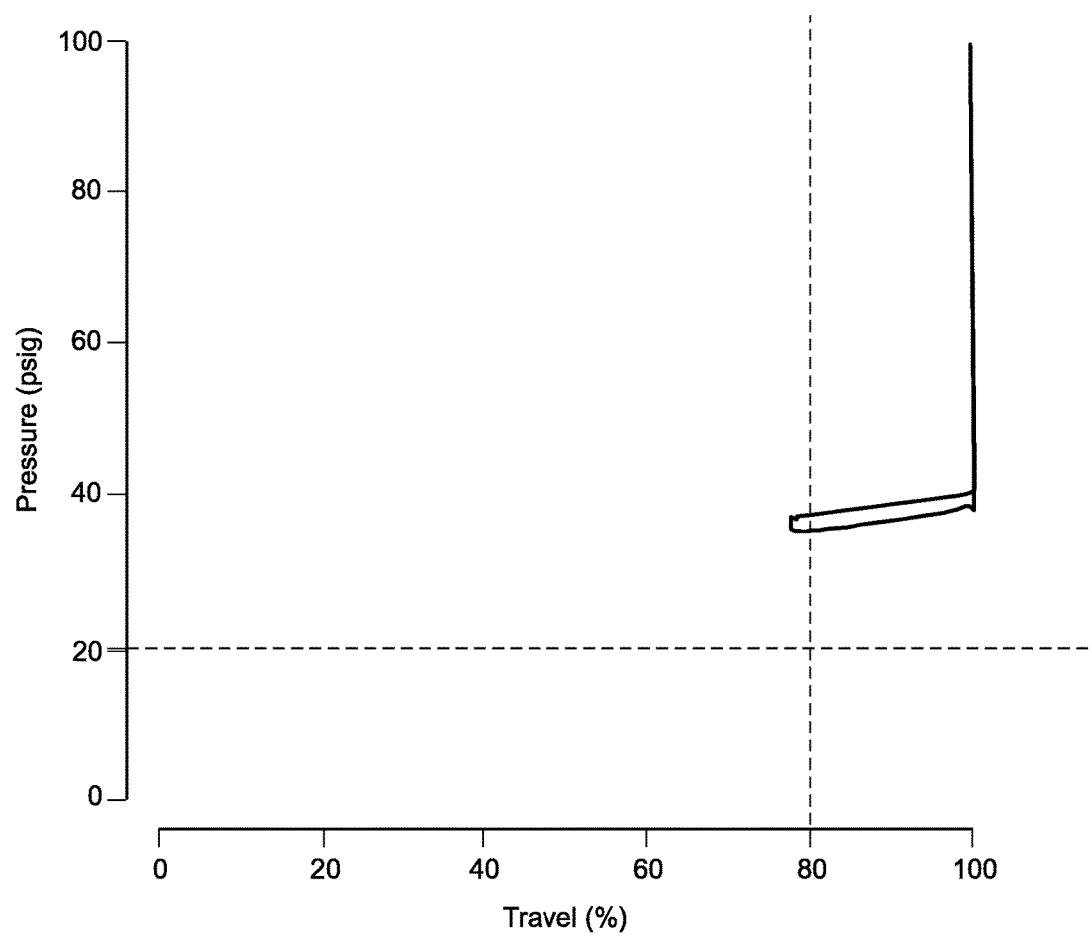

FIGS. 9A, 9B, and 9C include plots similar to those of FIGS. 7A, 7B, and 7B illustrating pressure (and pressure set point) vs. time, relative travel vs. time, and pressure vs. relative travel for a ramping of a pressure within a pneumatic valve actuator at a rate of 1%/second. However, instead of simply reversing the ramping of pressure as illustrated in FIG. 7A, FIG. 9A illustrates a stepping of pressure upon detecting travel of the pneumatic valve actuator (at approximately sixty-five seconds) and a subsequent ramping of the pressure back to the initial pressure. By employing this stepping of the pressure, a positioner may prevent drifting of a pneumatic valve actuator past a maximum desired travel (illustrated by the dotted line in FIG. 9B).

Although FIGS. 9A, 9B, and 9C include curves illustrating a stepping of a pressure upon detecting travel of a pneumatic valve actuator, controllers and/or positioner may step pressures at any suitable times during a partial stroke test. For example, the partial stroke test routine 220 may: (i) step a pressure at the beginning of a partial stroke test from an initial pressure to a pre-defined pressure, and (ii) then ramp from the pre-defined pressure towards a pressure limit. Such a procedure may allow more time efficient partial stroke tests. Generally, a stepping of pressure may occur at the beginning, towards the end, upon a detection of travel, and/or at any other point during a partial stroke test.

Figure 10A:
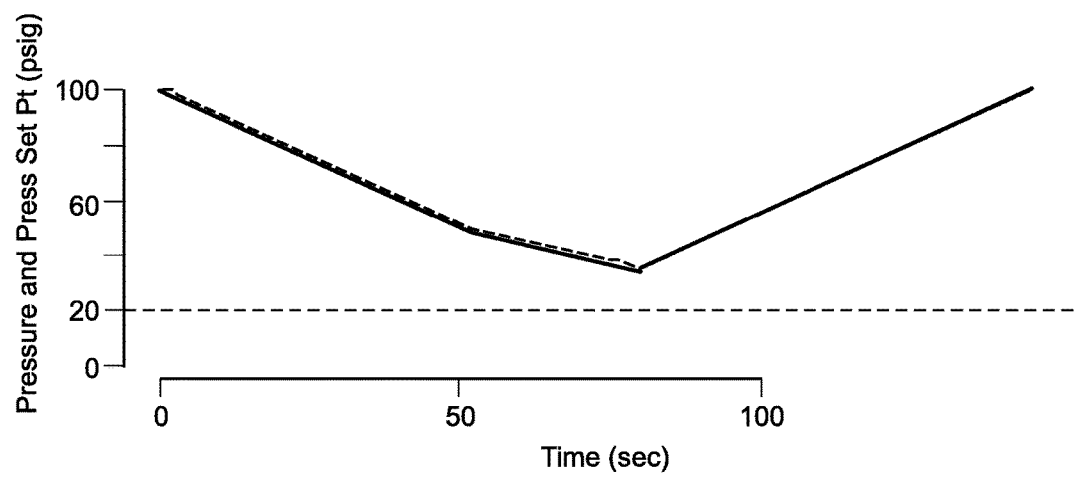
FIGS. 10A, 10B, and 10C illustrate various test result curves associated with yet another example partial stroke test utilizing dynamic pressure ramp rates, which can be performed by the positioner illustrated in FIG. 3.
Figure 10B:
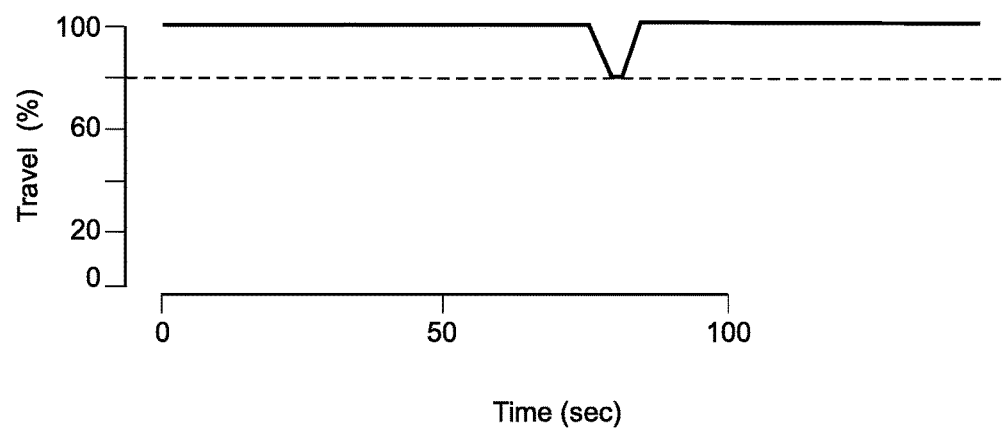
Figure 10C:
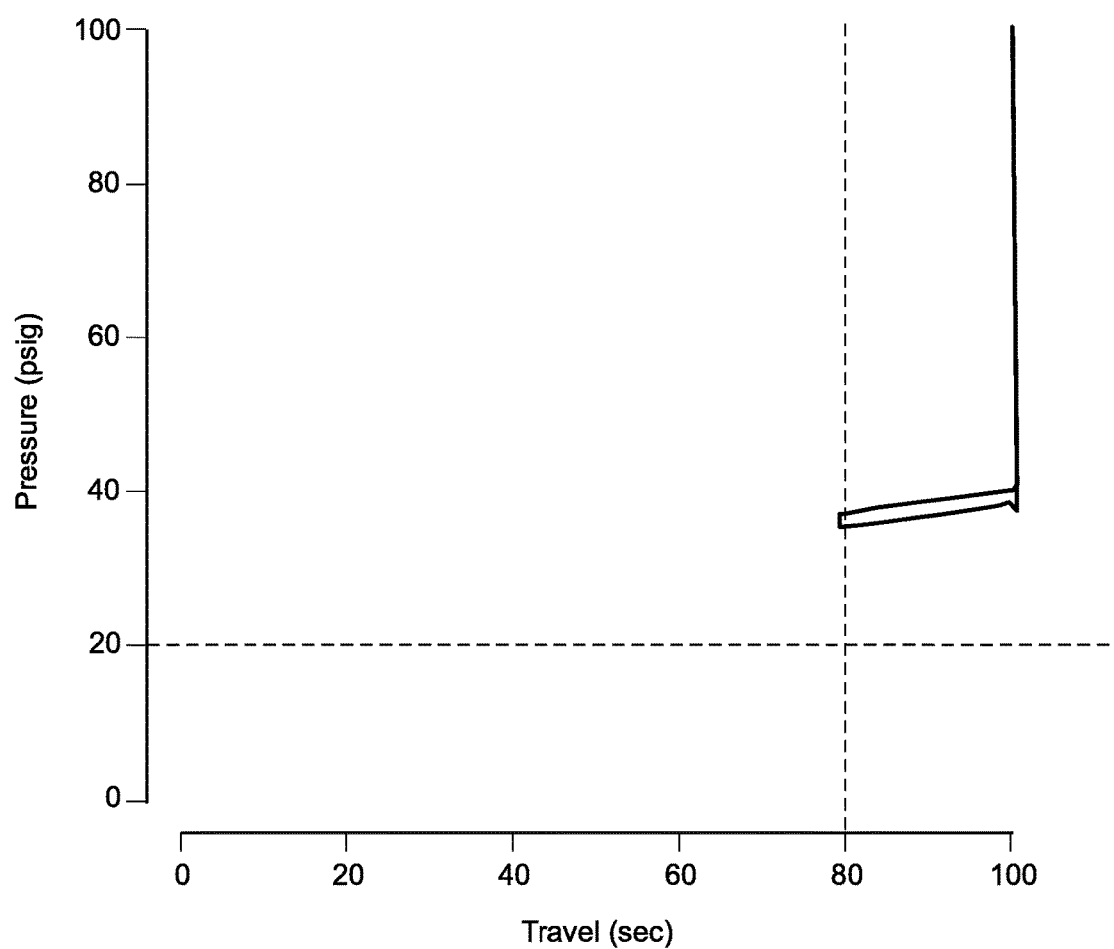

Moreover, a positioner may further reduce a drifting of a pneumatic valve actuator past a maximum travel or relative travel by employing dynamic ramp rates, as illustrated in FIGS. 10A, 10B, and 10C. FIGS. 10A, 10B, and 10C include plots similar to those of FIGS. 7A, 7B, 7B, 9A, 9B, and 9C illustrating pressure (and pressure set point) vs. time, relative travel vs. time, and pressure vs. relative travel for a ramping of a pressure within a pneumatic valve actuator. However, in contrast to FIGS. 7A, 7B, 7B, 9A, 9B, and 9C, in FIGS. 10A, 10B, and 10C, two ramp rates are utilized in the ramping of the pressure toward the pressure limit. For example, a ramping of the pressure may be slowed as the pressure approaches the pressure limit at one or more thresholds of pressure. As can be seen in FIG. 10B, such a dynamic ramping further prevents drifting a pneumatic valve actuator past a maximum desired travel or relative travel (illustrated by the dotted line in FIG. 10B). Although two ramp rates are utilized in the test depicted in FIGS. 10A, 10B, and 10C, it is understood that any number of ramp rates may be utilized in ramping a pressure towards a pressure limit and/or in reversing the ramping of the pressure back towards an initial pressure.

Figure 11:
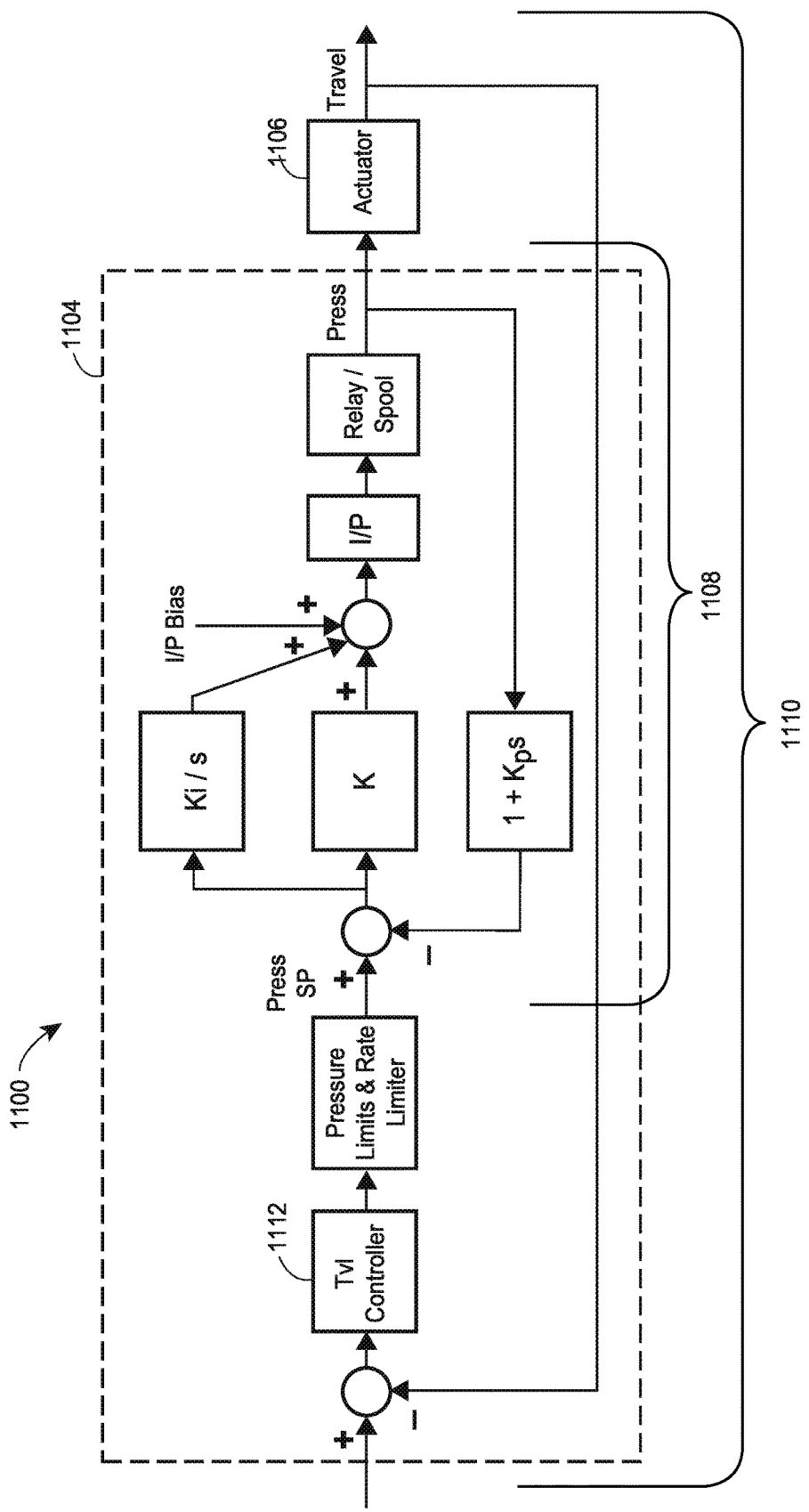
FIG. 11 illustrates a block diagram of an example control loop including an inner pressure control portion and an outer travel control portion, which can be, at least partially, implemented by the positioner illustrated in FIG. 3.

FIG. 11 illustrates an example control loop 1100 which may be utilized (e.g., by the positioner 200) to perform partial stroke or other tests with pressure control techniques, as described further with reference to FIG. 8. The process controller 11 and/or positioner 200 may implement at least a portion of the control loop 1100. Specifically, the example positioner 200 may implement a portion 1104 of the control loop 1100. As with the control loop 500, some implementations of the control loop 1100 may include components of the control loop 1100 (e.g., of the portion 1104) distributed in any suitable manner between a positioner and a controller, such as the process controller 11.

In the control loop 1100, the positioner 200 may receive pressure feedback values from an actuator 1106, such as the actuator portion of actuator/valve assembly 202 in FIG. 3. However, in the control loop 1100, the positioner 200 may also receive travel feedback values from the actuator 1106. The positioner 200 may generate a control signal (e.g., 1 mA nominal signal plus or minus 0.4 mA) indicative a pressure based on an internal pressure control portion 1108 of the control loop 1100 nested within an outer travel control portion 1110 of the control loop 1100.

The internal pressure control portion 1108 of the control loop 1100 may be substantially similar to portions of the control loop 500 configured to generate a control signal for the positioner 200 based on pressure feedback values, a pressure set point (or "SP"), and various integral, proportional, or derivative terms of the internal pressure control portion 1108. By nesting this internal pressure control portion 1108 inside the outer travel control portion 1110 of the control loop 1100, the positioner 200 implementing the control loop 1100 may ramp pressures within the actuator/valve assembly 202 until certain specific travel conditions are met. For example, the positioner 200 may ramp pressures within the actuator/valve assembly 202 until the actuator/valve assembly 202 has a traveled any finite amount, a certain pre-defined amount, a certain percentage of total travel, etc., as controlled by a travel controller 1112 of the outer travel control portion of the control loop 1100.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of testing a valve actuator coupled to a process control device, the method comprising:
controlling, with the process control device, a pressure within the valve actuator to ramp from an initial pressure towards a pre-determined pressure limit;
monitoring a position of the valve actuator to detect a travel of the valve actuator;
upon one of the pressure within the valve actuator reaching the pre-determined pressure limit or detecting the travel of the valve actuator, controlling the pressure within the valve actuator to step to a stepped pressure higher or lower than the pre-determined pressure limit or the pressure at which the travel of the valve actuator is detected; and
after controlling the pressure within the valve actuator to step to the stepped pressure, controlling the pressure within the valve actuator to return ramp from the stepped pressure to the initial pressure.

2. The method of claim 1, further comprising:
determining a bias of the process control device by comparing a measured pressure within the valve actuator to a set point pressure utilized by the process control device; wherein
controlling the pressure within the valve actuator to ramp from the initial pressure towards the pre-determined pressure limit includes accounting for the bias of the process control device.

3. The method of claim 1, wherein monitoring the position of the valve actuator to detect the travel of the valve actuator includes monitoring the position of the valve actuator to detect a predetermined amount of travel corresponding to a percentage of a possible travel of the valve actuator.

4. The method of claim 3, wherein:
controlling the pressure to ramp from the initial pressure towards the pre-determined pressure limit includes controlling the pressure based on a pressure control loop implemented by the process control device;
monitoring the position of the valve actuator to detect the certain amount of travel of the valve actuator includes monitoring the position of the valve actuator based on a travel control loop implemented by the process control device; and
the travel control loop includes the pressure control loop.

5. The method of claim 1, wherein monitoring the position of the valve actuator to detect the travel of the valve actuator includes monitoring the position of the valve actuator to detect any non-zero travel of the valve actuator.

6. The method of claim 5, wherein controlling the pressure to ramp from the initial pressure towards the pre-determined pressure limit and monitoring the position of the valve actuator includes controlling the pressure and monitoring the position of the valve actuator based on a pressure control loop separate from any other control loops.

7. The method of claim 1, wherein the valve actuator is part of a safety shutdown system.

8. The method of claim 1, wherein the valve actuator is coupled to a spool valve or a relay valve.

9. A system, comprising:
an actuator; and
a process control device coupled to the actuator, wherein the process control device is configured to:
control a pressure within the actuator to ramp from an initial pressure towards a pre-determined pressure limit;
gather measured values indicative of a position of the actuator to detect a travel of the actuator;
upon one of the pressure within the actuator reaching the pre-determined pressure limit or detecting the travel of the actuator, control the pressure within the actuator to step to a stepped pressure higher or lower than the pre-determined pressure limit or the pressure at which the travel of the actuator is detected; and
after controlling the pressure within the valve actuator to step to the stepped pressure, control the pressure within the actuator to ramp from the stepped pressure to the initial pressure.

10. The system of claim 9, wherein the process control device is further configured to:
determine a bias of the process control device by comparing a measured pressure within the actuator to a set point pressure utilized by the process control device; wherein controlling the pressure within the actuator to ramp from the initial pressure towards a pre-determined pressure limit includes accounting for the bias of the process control device.

11. The system of claim 10, wherein determining the bias of the process control device includes:
   determining a calibration pressure value corresponding to a particular state of the actuator;
   controlling, with the process control device, the pressure within the actuator according to the set point pressure, wherein the set point pressure is based on the calibration pressure value such that the actuator maintains the particular state;
   measuring an actual pressure within the actuator; and
   comparing the actual pressure to the set point pressure to determine the bias of the process control device.

12. The system of claim 9, wherein the process control device is further configured to determine the pre-determined pressure limit by driving the actuator to a hard stop and measuring a pressure corresponding to the hard stop.

13. A system, comprising:
   an actuator; and
   a process control device coupled to the actuator, wherein the process control device is configured to:
      ramp a pressure within the actuator from an initial pressure towards a pressure threshold according to a first ramp rate; and
      upon reaching the pressure threshold, ramp the pressure within the actuator from the pressure threshold to a pre-determined pressure limit according to a second ramp rate different from the first ramp rate;
      gather measured values indicative of a position of the actuator to detect a travel of the actuator; and
      upon one of the pressure within the actuator reaching the pre-determined pressure limit or detecting the travel of the actuator, control the pressure within the actuator to return to the initial pressure.

14. The system of claim 13, wherein controlling the pressure within the actuator to ramp from the initial pressure towards the pre-determined pressure limit includes controlling the pressure within the actuator to ramp from the initial pressure towards the pre-determined pressure limit according to three or more ramp rates.

15. The system of claim 13, wherein controlling the pressure within the actuator to return to the initial pressure includes:
   controlling the pressure in the actuator to step from one of the pre-determined pressure limit or the pressure at which the travel of the actuator is detected to a stepped pressure higher or lower than the pre-determined pressure limit or the pressure at which the travel of the actuator is detected; and
   after controlling the pressure to step, controlling the pressure to ramp from the stepped pressure towards the initial pressure.

16. A computer device, comprising:
   one or more processors; and
   one or more non-transitory memories having computer executable instructions stored thereon that, when executed by the one or more processors, cause the computer device to:
      control a pressure within an actuator to ramp from an initial pressure towards a pre-determined pressure limit;
      gather measured values indicative of a position of the actuator to detect a travel of the actuator;
      upon one of the pressure within the actuator reaching the pre-determined pressure limit or detecting the travel of the actuator, controlling the pressure to step to a stepped pressure higher or lower than the pre-determined pressure limit or the pressure at which the travel of the actuator is detected; and
      after controlling the pressure to step, control the pressure within the actuator to ramp from the stepped pressure towards the initial pressure to return to the initial pressure.

17. A computer device, comprising:
   one or more processors; and
   one or more non-transitory memories having computer executable instructions stored thereon that, when executed by the one or more processors, cause the computer device to:
      control a pressure within an actuator to ramp from an initial pressure towards a pre-determined pressure limit according to two or more ramp rates;
      gather measured values indicative of a position of the actuator to detect a travel of the actuator; and
      upon one of the pressure within the actuator reaching the pre-determined pressure limit or detecting the travel of the actuator, control the pressure within the actuator to return to the initial pressure.

18. A method of testing a valve actuator coupled to a process control device, the method comprising:
   controlling, with the process control device, a pressure within the valve actuator to ramp from an initial pressure towards a pre-determined pressure limit by ramping the pressure from the initial pressure towards a pressure threshold according to a first ramp rate and, upon reaching the pressure threshold, ramping the pressure from the pressure threshold to the pre-determined pressure limit according to a second ramp rate, different from the first ramp rate;
   monitoring a position of the valve actuator to detect a travel of the valve actuator; and
   upon one of the pressure within the valve actuator reaching the pre-determined pressure limit or detecting the travel of the valve actuator, controlling the pressure within the valve actuator to return to the initial pressure.

* * * * *

UNITED STATES PATENT AND TRADEMARK OFFICE
CERTIFICATE OF CORRECTION

PATENT NO.        : 9,611,873 B2
APPLICATION NO.   : 15/066495
DATED             : April 4, 2017
INVENTOR(S)       : Kenneth W. Junk It is certified that error appears in the above-identified patent and that said Letters Patent is hereby corrected as shown below:

In the Specification

At Column 1, Line 33, "stoke" should be -- stroke --.

At Column 4, Line 34, "test a" should be -- test an --.

At Column 14, Line 7, "an high" should be -- a high --.

At Column 14, Line 34, "in a" should be -- in an --.

At Column 16, Line 26, "FIGS. 7A, 7B, and 7B" should be -- FIGS. 7A, 7B, and 7C --.

At Column 16, Line 54, "FIGS. 7A, 7B, 7B," should be -- FIGS. 7A, 7B, 7C, --.

At Column 16, Line 58, "FIGS. 7A, 7B, 7B," should be -- FIGS. 7A, 7B, 7C, --.

Signed and Sealed this
Seventeenth Day of April, 2018

Andrei Iancu
*Director of the United States Patent and Trademark Office*